US010590353B2

(12) United States Patent
McCarthy et al.

(10) Patent No.: US 10,590,353 B2
(45) Date of Patent: Mar. 17, 2020

(54) INTEGRATED OXYGENATE CONVERSION AND OLEFIN OLIGOMERIZATION

(71) Applicant: ExxonMobil Research and Engineering Company, Annandale, NJ (US)

(72) Inventors: Stephen J. McCarthy, Center Valley, PA (US); Brandon J. O'Neill, Lebanon, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 15/808,011

(22) Filed: Nov. 9, 2017

(65) Prior Publication Data

US 2018/0155637 A1    Jun. 7, 2018

Related U.S. Application Data

(60) Provisional application No. 62/431,047, filed on Dec. 7, 2016.

(51) Int. Cl.
*C10G 50/00* (2006.01)
*B01J 29/40* (2006.01)
*C10G 3/00* (2006.01)
*C10L 1/04* (2006.01)
*C10G 57/02* (2006.01)

(52) U.S. Cl.
CPC ............ *C10G 50/00* (2013.01); *B01J 29/405* (2013.01); *C10G 3/49* (2013.01); *C10G 57/02* (2013.01); *C10L 1/04* (2013.01); *C10G 2300/202* (2013.01); *Y02P 30/20* (2015.11)

(58) Field of Classification Search
CPC ....... C07C 1/20; C07C 11/02; C07C 2529/40; C07C 2529/70; C07C 2529/85; C07C 2/12; C10G 2300/4081; C10G 2400/02; C10G 3/49; C10G 3/54; C10G 50/00; C10G 2300/202; C10G 57/02; B01J 29/405; C10L 1/04
See application file for complete search history.

(56) References Cited

U.S. PATENT DOCUMENTS

| | | |
|---|---|---|
| 3,702,886 A | 11/1972 | Argauer et al. |
| 3,709,979 A | 7/1973 | Chu |
| 3,894,104 A | 7/1975 | Chang et al. |
| 4,088,706 A | 5/1978 | Kaeding |
| RE29,948 E | 3/1979 | Dwyer et al. |
| 4,543,435 A | 9/1985 | Gould et al. |
| 4,560,537 A | 12/1985 | Tabak |
| 4,582,815 A | 4/1986 | Bowes |
| 4,898,717 A | 2/1990 | Hsia et al. |
| 4,935,568 A | 6/1990 | Harandi et al. |
| 6,372,949 B1 | 4/2002 | Brown et al. |
| 9,090,525 B2 * | 7/2015 | Brown ...................... C07C 1/20 |
| 2003/0183554 A1 | 10/2003 | Bazzani et al. |
| 2005/0279018 A1 | 12/2005 | Cracknell |
| 2013/0281753 A1 | 10/2013 | McCarthy et al. |
| 2015/0174561 A1 | 6/2015 | McCarthy et al. |
| 2015/0174562 A1 | 6/2015 | McCarthy et al. |
| 2015/0174563 A1 | 6/2015 | McCarthy et al. |
| 2015/0175499 A1 | 6/2015 | Ou et al. |
| 2015/0175897 A1 * | 6/2015 | Loveless .................. B01J 35/10 585/408 |
| 2016/0102032 A1 | 4/2016 | Du et al. |

FOREIGN PATENT DOCUMENTS

WO    2012161017 A1    11/2012

OTHER PUBLICATIONS

International Search Report and Written Opinion PCT/US2017/060801 dated Apr. 3, 2018.
International Search Report and Written Opinion PCT/US2017/060806 dated Feb. 5, 2018.
Ghosh et al., "Development of a Detailed Gasoline Composition-Based Octane Model", Industrial & Engineering Chemistry Research, 2006, pp. 337-345, vol. 45(1), ACS Publications.

\* cited by examiner

*Primary Examiner* — Sharon Pregler
(74) *Attorney, Agent, or Firm* — Liza Negron

(57) ABSTRACT

Systems and methods are provided for integration of an oxygenate conversion process with an olefin oligomerization process. The integrated process can produce gasoline of a desired octane and/or distillate fuel of a desired cetane.

20 Claims, 10 Drawing Sheets

INTEGRATED OXYGENATE CONVERSION AND OLEFIN OLIGOMERIZATION

CROSS-REFERENCE TO RELATED APPLICATIONS

This application claims the benefit of U.S. Provisional Application No. 62/431,047, filed on Dec. 7, 2016, the entire contents of which are incorporated herein by reference.

FIELD

This invention relates to integrated processes for forming naphtha boiling range products and distillate fuel boiling range products by oxygenate conversion and olefin oligomerization.

BACKGROUND

A variety of industrial processes are known for conversion of low boiling carbon-containing compounds to higher value products. For example, methanol to gasoline (MTG) is a commercial process that produces gasoline from methanol using ZSM-5 catalysts. In the MTG process, methanol is first dehydrated to dimethyl ether. The methanol and/or dimethyl ether then react in a series of reactions that result in formation of aromatic, paraffinic, and olefinic compounds. The resulting product consists of liquefied petroleum gas (LPG) and a high-quality gasoline comprised of aromatics, paraffins, and olefins. The typical MTG hydrocarbon product consists of about 40-50% aromatics plus olefins and about 50-60% paraffins.

U.S. Pat. No. 4,088,706 describes a method for converting methanol to para-xylene. The method includes exposing a feed to a zeolite catalyst that is modified to include boron and/or magnesium.

U.S. Pat. No. 3,894,104 describes a method for converting oxygenates to aromatics using zeolite catalysts impregnated with a transition metal. Yields of aromatics relative to the total hydrocarbon product are reported to be as high as about 58% with a corresponding total $C_5+$ yield as high as about 73%.

U.S. Patent Application Publication 2013/0281753 describes a phosphorous modified zeolite catalyst. The phosphorous modification reduces the change in alpha value for the catalyst after the catalyst is exposed to an environment containing steam. The phosphorous modified catalysts are described as being suitable, for example, for conversion of methanol to gasoline boiling range compounds.

U.S. Patent Application Publications 2015/0174561, 2015/0174562, and 2015/0174563 describe catalysts for conversion of oxygenates to aromatics. The catalysts include a zeolite, such as an MFI or MEL framework structure zeolite, with a supported Group 12 metal on the catalyst.

U.S. Pat. No. 9,090,525 describes conversion of oxygenates in the presence of a zeolitic catalyst to form naphtha boiling range compounds with increased octane. A portion of the naphtha boiling range olefins from an initial conversion product are recycled to the oxygenate conversion process to allow for formation of heavier naphtha boiling range compounds, including aromatics.

SUMMARY

In an aspect, a method for forming a naphtha composition and a distillate composition is provided. The method includes exposing a feed comprising oxygenates to a conversion catalyst at an average reaction temperature of 400° C. to 530° C. (or 440° C. to 530° C.), a total pressure of at least 150 psig (~1000 kPag), such as 1000 kPag to 2100 kPag, and a WHSV of 0.1 $hr^{-1}$ to 10 $hr^{-1}$ to form a converted effluent comprising a naphtha boiling range fraction, the naphtha boiling range fraction having an octane rating of at least 95. At least a portion of the converted effluent can then be cascaded to an oligomerization catalyst at a temperature of 125° C. to 250° C. to form an oligomerized effluent, the at least a portion of the converted effluent comprising ethylene, propylene, or a combination thereof. The oligomerized effluent can comprise, relative to a weight of hydrocarbons in the oligomerized effluent, at least 60 wt % of a distillate boiling range fraction (or at least 65 wt %, or at least 70 wt %) and/or at least 10 wt % of a 371° C.+ fraction (or at least 15 wt %) and/or less than 20 wt % of a 177° C.− fraction. Optionally, the distillate boiling range fraction having an aromatics content of about 1.0 wt % or less (or 0.5 wt % or less).

Optionally, the oligomerization catalyst comprises a 1-D 10-member ring zeolite or a 2-D 10-member ring zeolite. For example, the zeolite can have an MRE framework structure, an MFI framework structure, or a combination thereof. Optionally, the zeolite can have a silicon to aluminum ratio of 10 to 200, or 20 to 40, and an Alpha value of at least 5, or at least 15, or at least 100. Optionally, the distillate boiling range fraction can have a cetane rating of at least 40, or the 371° C.+ fraction can have a cetane rating of at least 50, or a combination thereof.

Optionally, the conversion catalyst can comprise an MFI framework zeolite, the conversion catalyst further comprising 0.5 wt % to 1.5 wt % Zn supported on the conversion catalyst, the conversion catalyst optionally further comprising P supported on the conversion catalyst, a molar ratio of P to Zn supported on the conversion catalyst being about 1.5 to 3.0.

In some aspects, cascading at least a portion of the converted effluent to an oligomerization catalyst can further comprise separating water from the at least a portion of the converted effluent prior to exposing the at least a portion of the converted effluent to the oligomerization catalyst. The at least a portion of the converted effluent can optionally comprise about 10 wt % or less of water relative to a total weight of the converted effluent.

Optionally, the conversion catalyst and the oligomerization catalyst can be located in the same reactor; or the at least a portion of the converted effluent can be exposed to the oligomerization catalyst without prior compression; or a combination thereof.

In another aspect, a method for forming a naphtha composition and a distillate composition is provided. The method can include exposing a feed comprising oxygenates to a conversion catalyst at an average reaction temperature of about 440° C. to about 530° C. (or about 450° C. to about 500° C.), a total pressure of 100 psig (~700 kPag) to 300 psig (~2100 kPag), and a WHSV of 0.1 $hr^{-1}$ to 10.0 $hr^{-1}$ to form a converted effluent. The converted effluent can include ethylene, propylene, or a combination thereof and can further include at least 50 wt % of a naphtha boiling range fraction relative to a weight of hydrocarbons in the converted effluent (or at least 55 wt %, or at least 60 wt %). Optionally, the naphtha boiling range fraction can comprise at least 40 wt % aromatics. At least a portion of the converted effluent can be separated to form at least a first effluent fraction comprising at least 50 wt % of the naphtha boiling range fraction and a second effluent fraction comprising at least 50 wt % of the ethylene, propylene, or a combination thereof, at least one of the first effluent fraction and the naphtha boiling range fraction having an octane rating of at least 95, the octane rating being defined as (RON+MON)/2. At least a portion of the second effluent fraction can be exposed to an oligomerization catalyst at a temperature of 125° C. to 250° C. and a total pressure of 150 psig (~1000 kPag) to 1000 psig (~6900 kPag) to form an oligomerized effluent comprising, relative to a weight of hydrocarbons in the oligomerized effluent, at least 60 wt % of a distillate boiling range fraction, at least 15 wt % of a 371° C.+ fraction, and less than 20 wt % of a 177° C.- fraction. Optionally, the distillate boiling range fraction can have an aromatics content of about 1.0 wt % or less (or 0.5 wt % or less) and a cetane rating of at least 40. Optionally, the 371° C.+ fraction can have a cetane rating of at least 50. The conversion catalyst can optionally comprise a 10-member ring zeolite such as ZSM-5, having a silicon to aluminum ratio of 10 to 200 (preferably 20 to 40) and an Alpha value of at least 5 (preferably at least 100), the conversion catalyst further comprising 0.1 wt % to 1.5 wt % Zn supported on the catalyst and optionally further comprising P supported on the conversion catalyst, a molar ratio of P to Zn supported on the conversion catalyst being about 1.5 to 3.0.

Optionally, exposing the feed comprising oxygenates to a conversion catalyst can comprise exposing the feed comprising oxygenate to the conversion catalyst in a fluidized bed, a moving bed, a riser reactor, or a combination thereof. The conversion catalyst can being withdrawn and regenerated at a rate corresponding to regeneration of 0.3 wt % to 5.0 wt % of catalyst per 1 g of methanol exposed to a g of conversion catalyst (optionally 1.5 wt % to 3.0 wt %). Additionally or alternately, an average catalyst exposure time for the conversion catalyst can be 1 gram to 2000 grams of methanol per gram of catalyst, or 1 gram to 250 grams of methanol per gram of catalyst, or 250 grams to 500 grams of methanol per gram of catalyst.

Optionally, the oligomerization catalyst can comprise an MRE framework zeolite, an MFI framework zeolite, or a combination thereof, such as ZSM-48. Optionally, the conversion catalyst can comprises an MRE framework zeolite, an MFI framework zeolite, an MEL framework zeolite, or a combination thereof, such as ZSM-5.

In still another aspect, a method for forming a naphtha composition and a distillate composition is provided. The method can include exposing a feed comprising methanol to a conversion catalyst in a fluidized bed or moving bed at an average reaction temperature of about 400° C. to about 530° C., a total pressure of 100 psig (~700 kPag) to 300 psig (~2100 kPag), and a WHSV of 0.1 hr$^{-1}$ to 10.0 hr$^{-1}$ to form a converted effluent comprising a naphtha boiling range fraction. At least a portion of the converted effluent can be separated to form at least a first effluent fraction comprising at least 50 wt % of the naphtha boiling range fraction and a second effluent fraction comprising ethylene, propylene, or a combination thereof. At least a portion of the second effluent fraction can be exposed to an oligomerization catalyst at a temperature of 125° C. to 250° C. and a total pressure of 150 psig (~1000 kPag) to 1000 psig (~6900 kPag) to form an oligomerized effluent comprising, relative to a weight of hydrocarbons in the oligomerized effluent, at least 60 wt % of a distillate boiling range fraction, at least 15 wt % of a 371° C.+ fraction, and less than 20 wt % of a 177° C.- fraction. Optionally, the distillate boiling range fraction can have an aromatics content of about 1.0 wt % or less and a cetane rating of at least 40. Optionally, the 371° C.+ fraction can have a cetane rating of at least 50. The conversion catalyst can correspond to a 10-member ring or 12-member ring zeolite that comprises a framework structure different from an MFI or MEL framework structure. Optionally, the zeolite can have a silicon to aluminum ratio of 10 to 200 and an Alpha value of at least 5. The conversion catalyst can further comprise 0.1 wt % to 1.5 wt % Zn supported on the catalyst. The conversion catalyst can further comprise an average catalyst exposure time of 50 grams to 150 grams of methanol per gram of catalyst.

Optionally, the framework structure of the conversion catalyst can be the same as a framework structure for the oligomerization catalyst. Optionally, the conversion catalyst can comprise the same zeolite as a zeolite of the oligomerization catalyst, the zeolite optionally comprising ZSM-48.

In yet another aspect, a composition comprising an effluent from a process for conversion of methanol and/or dimethyl ether is provided. The composition can include at least 40 wt % water and can further include, relative to a weight of hydrocarbons in the composition, at least 50 wt % of a naphtha boiling range fraction (or at least 55 wt %, or at least 60 wt %). The naphtha boiling range fraction can comprise at least 35 wt % aromatics and at least 20 wt % paraffins, at least 50 wt % of the paraffins in the composition comprising $C_3$ or $C_4$ paraffins and 15 wt % to 30 wt % of the paraffins comprising $C_5$+ paraffins. Optionally, the naphtha boiling range fraction can have an octane rating of at least 95 (or at least 97 or at least 100), the octane rating being defined as (RON+MON)/2. The naphtha boiling range fraction can optionally comprise at least 40 wt % aromatics and less than 10 wt % olefins.

In still another aspect, a system for performing oxygenate conversion is provided. The system can include a conversion reactor comprising a conversion reactor inlet and a conversion reactor outlet, the conversion reactor further comprising a conversion catalyst comprising a 10-member ring zeolite (optionally having an MFI framework structure, MEL framework structure, and/or MRE framework structure), the zeolite optionally having a silicon to aluminum ratio of 10 to 200 (or 20 to 40) and an Alpha value of at least 5 (or at least 15 or at least 100). The conversion catalyst can further comprising 0.1 wt % to 1.5 wt % Zn supported on the catalyst. The system can further include a separation stage comprising a separator inlet, a first separator outlet, a second separator product, and an aqueous phase outlet. The separator inlet can be in direct fluid communication with the conversion reactor outlet, the direct fluid communication not passing through a compressor. The system can further include an oligomerization reactor comprising an oligomerization reactor inlet and an oligomerization reactor outlet, the oligomerization reactor further comprising an oligomerization catalyst. The oligomerization reactor inlet can be in direct fluid communication with the first separator outlet, the direct fluid communication not passing through a compressor. Additionally or alternately, the oligomerization reactor inlet can be in indirect fluid communication with the conversion reactor outlet via the separation stage. The oligomerization catalyst can further comprise a 10-member ring zeolite (optionally having an MRE and/or MFI framework structure), the zeolite having a silicon to aluminum ratio of 10 to 200 (or 20 to 40) and an Alpha value of at least 5 (or at least 10).

DETAILED DESCRIPTION

Figure 1:
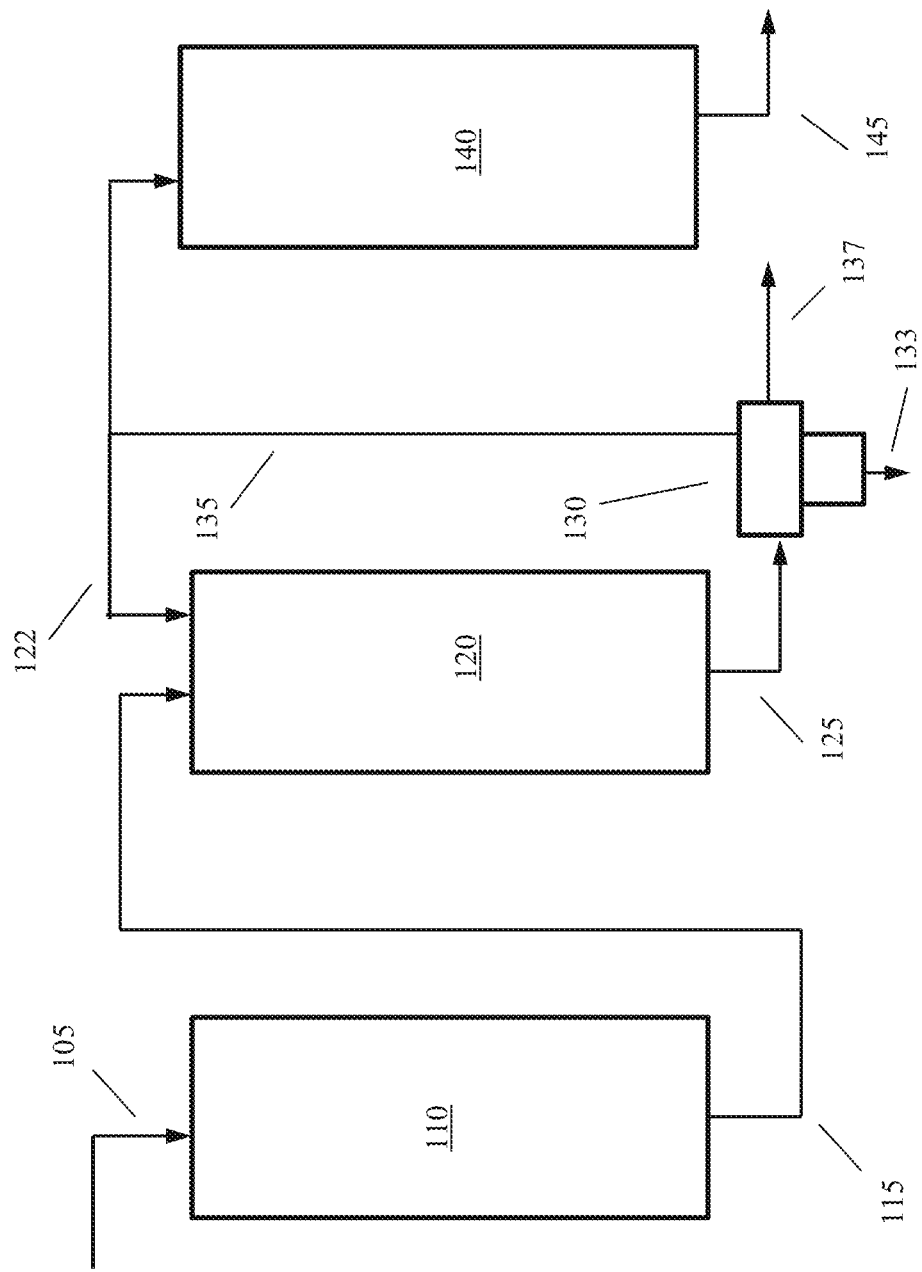
FIG. 1 schematically shows an example of a reaction system including both a conversion reactor and an oligomerization reactor.

Natural gas, coal, and/or biomass are becoming increasingly important sources of carbon for use in production of fuel and/or lubricant products. A first step in conversion of carbon from a natural gas, coal, and/or biomass source can be a conversion of methane to methanol. Once methanol is formed, various fixed bed, fluid bed, and moving bed processes can be used to convert methanol to higher value products, such as fuels, aromatics, and/or olefins.

For fuels production, one option can be to directly convert methanol to form naphtha boiling range fuel products and distillate boiling range fuel products. The conditions for forming naphtha boiling range fuel products, however, can tend to favor aromatics production, which may not be desirable for a distillate boiling range fuel product. Another option can be to first convert methanol to olefins and then perform an oligomerization reaction to form distillate products.

In some aspects, catalysts, systems, and methods are provided for co-production of high octane naphtha boiling range products and high cetane distillate boiling range products. The naphtha boiling range products can be generated by exposing an oxygenate-containing feed to a conversion catalyst corresponding to a zeolitic catalyst that includes supported transition metals and/or phosphorus. This can produce a naphtha boiling range fraction (or fractions) along with distillate boiling range fraction(s) and light ends. The naphtha boiling range fraction(s) can have an octane rating of at least 95. The light ends can include $C_2$ to $C_4$ olefins (such as ethylene and/or propylene) that can then be exposed to an oligomerization catalyst to form an oligomerized distillate boiling range fraction (or fractions). The oligomerized distillate boiling range fraction(s) can have a cetane rating of at least 40. Optionally, a portion of the light ends can be recycled to the process for forming the high octane naphtha boiling range fraction.

Additionally or alternately, in some aspects an oxygenate conversion reactor and an oligomerization reactor can be operated under conditions that allow for transfer of effluents and/or recycle streams between reactors without requiring substantial pressure changes in the transferred effluents and/or recycle streams. In particular, the oxygenate conversion reactor can be operated at a pressure that can allow for subsequent oligomerization of olefins from a fraction the conversion effluent without prior additional compression of the olefin-containing fraction. This can be combined with use of ZSM-48 as the oligomerization catalyst to allow for improved yield of 177° C.+ product from oligomerization at pressures of ~1400 kPag or less. Still another option can be to perform oxygenate conversion and oligomerization in a single reactor, so that similar temperatures and pressures are used for both conversion and oligomerization.

Additionally or alternately, in some aspects, catalysts, systems and methods are provided for co-production of naphtha boiling range products and distillate boiling range products in a flexible manner, where the relative yields of naphtha and distillate boiling range products can be controlled by controlling the rate of regeneration for the conversion catalyst. A conversion catalyst that is exposed to an oxygenate feed under conversion conditions can undergo changes in activity as the length of exposure increases. These changes in activity can be at least partially mitigated by regeneration of the catalyst. In a fluidized bed or moving bed environment, the recycle and/or recirculation rate of a conversion catalyst can be controlled to allow the activity of a catalyst to be maintained in a desired activity window relative to the amount of exposure to the feed. This can allow, for example, adjustment of the yields of distillate versus naphtha boiling range products based on relative demand for the types of products.

In this discussion, octane rating is defined as (RON+MON)/2, where RON is research octane number and MON is motor octane number. For values reported in the examples below, RON and MON values were determined based on a published model that determines octane ratings for a blend of components based to determine a blended octane. The model is described at Ind Eng Chem Res 2006, 45, 337-345. The model is believed to correlate with experimentally determined values. In the claims below, Research Octane Number (RON) is determined according to ASTM D2699. Motor Octane Number (MON) is determined according to ASTM D2700.

In this discussion, the naphtha boiling range is defined as 50° F. (~10° C., roughly corresponding to the lowest boiling point of a pentane isomer) to 350° F. (177° C.). The distillate fuel boiling range, is defined as 350° F. (177° C.) to 700° F. (371° C.). Compounds ($C_{4-}$) with a boiling point below the naphtha boiling range can be referred to as light ends. It is noted that due to practical consideration during fractionation (or other boiling point based separation) of hydrocarbon-like fractions, a fuel fraction formed according to the methods described herein may have T5 and T95 distillation points corresponding to the above values (or T10 and T90 distillation points), as opposed to having initial/final boiling points corresponding to the above values. A fractional weight boiling point or distillation point, such as a Txx boiling point, corresponds to a temperature at which xx % of composition can be boiled or distilled off from a composition. For example, a T5 boiling point refers to a temperature required to boil or distill off 5 wt % of a composition. Initial boiling points, final boiling points, and/or various fractional weight boiling points can be determined using an appropriate ASTM method. Examples of suitable ASTM methods include ASTM D86 (atmospheric distillation) and ASTM D2887 (simulated distillation by gas chromatography). In this discussion and the claims below, ASTM D2887 should be used for determining boiling points (including fractional weight boiling points), unless some characteristic of a sample causes ASTM D2887 to be impractical.

Catalysts for Oxygenate Conversion and Oligomerization

In various aspects, a transition metal-enhanced zeolite catalyst composition can be used for conversion of oxygenate feeds to naphtha boiling range fractions and olefins. In various aspects, an optionally transition metal-enhanced zeolite catalyst composition can be used for oligomerization of olefins generated during conversion of an oxygenate feed for formation of distillate boiling range fractions. In this discussion and the claims below, a zeolite is defined to refer to a crystalline material having a porous framework structure built from tetrahedra atoms connected by bridging oxygen atoms. Examples of known zeolite frameworks are given in the "Atlas of Zeolite Frameworks" published on behalf of the Structure Commission of the International Zeolite Association", 6$^{th}$ revised edition, Ch. Baerlocher, L. B. McCusker, D. H. Olson, eds., Elsevier, N.Y. (2007) and the corresponding web site, http://www.iza-structure.org/databases/. Under this definition, a zeolite can refer to aluminosilicates having a zeolitic framework type as well as crystalline structures containing oxides of heteroatoms different from silicon and aluminum. Such heteroatoms can include any heteroatom generally known to be suitable for inclusion in a zeolitic framework, such as gallium, boron, germanium, phosphorus, zinc, and/or other transition metals that can substitute for silicon and/or aluminum in a zeolitic framework.

A suitable zeolite can include a 10-member or 12-member ring pore channel network, such as a 1-dimensional 10-member ring pore channel or a 3-dimensional 10-member ring pore channel. Examples of suitable zeolites having a 3-dimensional 10-member ring pore channel network include zeolites having an MFI or MEL framework, such as ZSM-5 or ZSM-11. ZSM-5 is described in detail in U.S. Pat. No. 3,702,886 and Re. 29,948. ZSM-11 is described in detail in U.S. Pat. No. 3,709,979. Preferably, the zeolite is ZSM-5. Examples of suitable zeolites having a 1-dimensional 10-member ring pore channel network include zeolites having a MRE (ZSM-48), MTW, TON, MTT, and/or MFS framework. In some aspects, a zeolite with a 3-dimensional pore channel can be preferred for conversion of methanol, such as a zeolite with an MFI framework. In some aspects, a zeolite with a 1-dimensional 10-member ring pore channel and/or a zeolite with an MFI framework can be suitable for oligomerization of olefins. An example of a suitable oligomerization catalyst can include a zeolite with MRE (ZSM-48) framework.

Generally, a zeolite having desired activity for methanol conversion can have a silicon to aluminum molar ratio of about 10 to about 200, or about 15 to about 100, or about 20 to about 80, or about 20 to about 40. For example, the silicon to aluminum ratio can be at least about 10, or at least about 20, or at least about 30, or at least about 40, or at least about 50, or at least about 60. Additionally or alternately, the silicon to aluminum ratio can be about 300 or less, or about 200 or less, or about 100 or less, or about 80 or less, or about 60 or less, or about 50 or less. Generally, a zeolite having desired activity for oligomerization of olefins can have a silicon to aluminum molar ratio of about 20 to about 100, or about 30 to about 80, or about 40 to about 70. For example, the silicon to aluminum ratio can be at least about 20, or at least about 30, or at least about 40, or at least about 50. Additionally or alternately, the silicon to aluminum ratio can be about 100 or less, or about 80 or less, or about 60 or less.

Typically, reducing the silicon to aluminum ratio in a zeolite will result in a zeolite with a higher acidity, and therefore higher activity for cracking of hydrocarbon or hydrocarbonaceous feeds, such as petroleum feeds. However, with respect to conversion of oxygenates to aromatics, such increased cracking activity may not be beneficial, and instead may result in increased formation of residual carbon or coke during the conversion reaction. Such residual carbon can deposit on the zeolite catalyst, leading to deactivation of the catalyst over time. Having a silicon to aluminum ratio of at least about 40, such as at least about 50 or at least about 60, can reduce or minimize the amount of additional residual carbon that is formed due to the acidic or cracking activity of a catalyst.

It is noted that the molar ratio described herein is a ratio of silicon to aluminum. If a corresponding ratio of silica to alumina were described, the corresponding ratio of silica ($SiO_2$) to alumina ($Al_2O_3$) would be twice as large, due to the presence of two aluminum atoms in each alumina stoichiometric unit. Thus, a silicon to aluminum ratio of 10 corresponds to a silica to alumina ratio of 20.

In some aspects, a zeolite in a catalyst can be present at least partly in the hydrogen form. Depending on the conditions used to synthesize the zeolite, this may correspond to converting the zeolite from, for example, the sodium form. This can readily be achieved, for example, by ion exchange to convert the zeolite to the ammonium form followed by calcination in air or an inert atmosphere at a temperature of about 400° C. to about 700° C. to convert the ammonium form to the active hydrogen form.

Additionally or alternately, the catalyst composition can include and/or be enhanced by a transition metal. Preferably the transition metal is a Group 12 metal from the IUPAC periodic table (sometimes designated as Group IIB) selected from Zn, Cd, or a combination thereof. More generally, the transition metal can be any convenient transition metal selected from Groups 6-15 of the IUPAC periodic table. The transition metal can be incorporated into the zeolite/catalyst by any convenient method, such as by impregnation, by ion exchange, by mulling prior to extrusion, and/or by any other convenient method. Optionally, the transition metal incorporated into a zeolite/catalyst can correspond to two or more metals. After impregnation or ion exchange, the transition metal-enhanced catalyst can be treated in air or an inert atmosphere at a temperature of about 400° C. to about 700° C. The amount of transition metal can be expressed as a weight percentage of metal relative to the total weight of the catalyst (including any zeolite and any binder). A catalyst can include about 0.05 wt % to about 20 wt % of one or more transition metals, or about 0.1 wt % to about 10 wt %, or about 0.1 wt % to about 5 wt %, or about 0.1 wt % to about 2.0 wt %. For example, the amount of transition metal can be at least about 0.1 wt % of transition metal, or at least about 0.25 wt % of transition metal, or at least about 0.5 wt %, or at least about 0.75 wt %, or at least about 1.0 wt %. Additionally or alternately, the amount of transition metal can be about 20 wt % or less, or about 10 wt % or less, or about 5 wt % or less, or about 2.0 wt % or less, or about 1.5 wt % or less, or about 1.2 wt % or less, or about 1.1 wt % or less, or about 1.0 wt % or less.

In some optional aspects, a catalyst composition can be substantially free of phosphorous. A catalyst composition that is substantially free of phosphorous can contain about 0.01 wt % of phosphorous or less, such as less than about 0.005 wt % of phosphorous, or less than about 0.001 wt % of phosphorous. A catalyst composition that is substantially free of phosphorous can be substantially free of intentionally added phosphorous or substantially free of both intentionally added phosphorous as well as phosphorous present as an impurity in a reagent for forming the catalyst composition. In some aspects, the catalyst composition can contain no added phosphorous, such as containing no intentionally added phosphorous and/or containing no phosphorous impurities to within the detection limits of standard methods for characterizing a reagent and/or a resulting zeolite.

Optionally but preferably, a catalyst for methanol conversion can include added phosphorus, such as phosphorus added by impregnation, ion exchange, mulling prior to extrusion, or another convenient method. The amount of phosphorus can be related to the amount of transition metal in the catalyst composition. In some aspects, the molar ratio of phosphorus to transition metal can be 0.5 to 5.0, or 1.5 to 3.0, or 1.0 to 2.5, or 1.5 to 2.5. At higher molar ratios of phosphorus to transition metal, the phosphorus can be beneficial for maintaining a relatively stable selectivity for aromatics formation during an oxygenate conversion process. Additionally or alternately, a catalyst can include about 0.05 wt % to about 10 wt % of phosphorus, or about 0.1 wt % to about 10 wt %, or about 0.1 wt % to about 5 wt %, or about 0.1 wt % to about 2.0 wt %. For example, the amount of phosphorus can be at least about 0.1 wt %, or at least about 0.25 wt %, or at least about 0.5 wt %, or at least about 0.75 wt %, or at least about 1.0 wt %. Additionally or alternately, the amount of phosphorus can be about 10 wt % or less, or about 5 wt % or less, or about 2.0 wt % or less, or about 1.5 wt % or less, or about 1.2 wt % or less, or about 1.1 wt % or less, or about 1.0 wt % or less.

The catalyst composition can employ the transition metal-enhanced zeolite in its original crystalline form or after formulation into catalyst particles, such as by extrusion. A process for producing zeolite extrudates in the absence of a binder is disclosed in, for example, U.S. Pat. No. 4,582,815, the entire contents of which are incorporated herein by reference. Preferably, the transition metal can be incorporated after formulation of the zeolite (such as by extrusion) to form self-bound catalyst particles. Optionally, a self-bound catalyst can be steamed after extrusion. The terms "unbound" and "self-bound" are intended to be synonymous and mean that the present catalyst composition is free of any of the inorganic oxide binders, such as alumina or silica, frequently combined with zeolite catalysts to enhance their physical properties.

The transition metal-enhanced zeolite catalyst composition employed herein can further be characterized based on activity for hexane cracking, or Alpha value. Alpha value is a measure of the acid activity of a zeolite catalyst as compared with a standard silica-alumina catalyst. The alpha test is described in U.S. Pat. No. 3,354,078; in the Journal of Catalysis, Vol. 4, p. 527 (1965); Vol. 6, p. 278 (1966); and Vol. 61, p. 395 (1980), each incorporated herein by reference as to that description. The experimental conditions of the test used herein include a constant temperature of about 538° C. and a variable flow rate as described in detail in the Journal of Catalysis, Vol. 61, p. 395. Higher alpha values correspond with a more active cracking catalyst. For an oxygenate conversion catalyst, Alpha values of at least 5 or at least 15 can be suitable, with alpha values greater than 100 being preferred. In particular, the Alpha value can be about 5 to about 1000, or about 15 to about 1000, or about 50 to about 1000, or about 100 to about 1000. For an olefin oligomerization catalyst, Alpha values of at least 5 can be suitable. For example, the Alpha value can be about 5 to about 150, or about 10 to about 150, or about 20 to about 120.

As an alternative to forming self-bound catalysts, zeolite crystals can be combined with a binder to form bound catalysts. Suitable binders for zeolite-based catalysts can include various inorganic oxides, such as silica, alumina, zirconia, titania, silica-alumina, cerium oxide, magnesium oxide, yttrium oxide, or combinations thereof. Generally, a binder can be present in an amount between about 1 wt % and about 95 wt %, for example between about 5 wt % and about 40 wt % of a catalyst composition. In some aspects, the catalyst can include at least about 5 wt % binder, or at least about 10 wt %, or at least about 20 wt %. Additionally or alternately, the catalyst can include about 90 wt % or less of binder, or about 50 wt % or less, or about 40 wt % or less, or about 35 wt % or less. Combining the zeolite and the binder can generally be achieved, for example, by mulling an aqueous mixture of the zeolite and binder and then extruding the mixture into catalyst pellets. A process for producing zeolite extrudates using a silica binder is disclosed in, for example, U.S. Pat. No. 4,582,815. Optionally, a bound catalyst can be steamed after extrusion.

In some aspects, a binder can be used that is substantially free of alumina, such as a binder that is essentially free of alumina. In this description, a binder that is substantially free of alumina is defined as a binder than contains about 10 wt % alumina or less, such as about 7 wt % or less, or about 5 wt % or less, or about 3 wt % or less. A binder that is essentially free of alumina is defined as a binder that contains about 1 wt % or less, such as about 0.5 wt % or less, or about 0.1 wt % or less. In still other aspects, a binder can be used that contains no intentionally added alumina and/or that contains no alumina within conventional detection limits for determining the composition of the binder and/or the reagents for forming the binder. Although alumina is commonly used as a binder for zeolite catalysts, due in part to ease of formulation of alumina-bound catalysts, in some aspects the presence of alumina in the binder can reduce or inhibit the activity of a transition metal-enhanced zeolite for converting methanol to aromatics. For example, for a catalyst where the transition metal is incorporated into the catalyst after formulation of the bound catalyst (such as by extrusion), the transition metal may have an affinity for exposed alumina surfaces relative to exposed zeolite surfaces, leading to increased initial deposition and/or migration of transition metal to regions of the bound catalyst with an alumina surface in favor of regions with a zeolite surface. Additionally or alternately, alumina-bound catalysts can tend to have low micropore surface area, meaning that the amount of available zeolite surface available for receiving a transition metal may be undesirably low.

As an example of forming a bound catalyst, the following procedure describes a representative method for forming silica bound ZSM-5 catalyst particles. ZSM-5 crystal and a silica binder, such as an Ultrasil silica binder, can be added to a mixer and mulled. Additional deionized water can be added during mulling to achieve a desired solids content for extrusion. Optionally, a caustic solution can also be added to the mixture and mulled. The mixture can then be extruded into a desired shape, such as $\frac{1}{10}$" quadralobes. The extrudates can be dried overnight at about 250° F. (121° C.) and then calcined in nitrogen for about 3 hours at about 1000° F. (538° C.). The extrudates can then be exchanged twice with an about 1N solution of ammonium nitrate. The exchanged crystal can be dried overnight at about 250° F. (121° C.) and then calcined in air for about 3 hours at about 1000° F. (538° C.). This results in a silica bound catalyst. Based on the exchange with ammonium nitrate and subsequent calcinations in air, the ZSM-5 crystals in such a bound catalyst can correspond to ZSM-5 with primarily hydrogen atoms at the ion exchange sites in the zeolite. Thus, such a bound catalyst is sometimes described as being a bound catalyst that includes H-ZSM-5.

A transition metal-enhanced catalyst can be formed by any convenient method. One option for forming a transition metal-enhanced catalyst can be to impregnate a bound catalyst via incipient wetness with a solution containing the desired metal for impregnation, such as Zn or P. The impregnated crystal can then be dried overnight at about 250° F. (121° C.), followed by calcination in air for about 3 hours at about 1000° F. (538° C.). More generally, a transition metal can be incorporated into the ZSM-5 crystals and/or catalyst at any convenient time, such as before or after ion exchange to form H-ZSM-5 crystals, or before or after extrusion. In some aspects that are preferred from a standpoint of facilitating manufacture of a bound zeolite catalyst, the transition metal can be incorporated into the bound catalyst (such as by impregnation or ion exchange) after formation of the bound catalyst by extrusion or another convenient method.

Feedstocks and Products—Oxygenate Conversion

In various aspects, catalysts described herein can be used for conversion of oxygenate feeds to aromatics and/or olefins products, such as oxygenates containing at least one $C_1$-$C_4$ alkyl group and/or other oxygenates. In this discussion, a feed comprising oxygenates is defined to include feeds comprising a single type of oxygenate component (such as a feed comprising methanol) as well as feeds comprising a plurality of oxygenate components (such as a feed comprising methanol, ethanol, and dimethyl ether). It is noted that in some aspects, a plurality of feeds comprising oxygenates can be introduced into a reaction environment, such as a first feed that includes oxygenates in the form of methanol and a second feed that includes oxygenates in the form of ethanol. Examples of suitable oxygenates include feeds containing methanol, dimethyl ether, $C_1$-$C_4$ alcohols, ethers with $C_1$-$C_4$ alkyl chains, including both asymmetric ethers containing $C_1$-$C_4$ alkyl chains (such as methyl ethyl ether, propyl butyl ether, or methyl propyl ether) and symmetric ethers (such as diethyl ether, dipropyl ether, or dibutyl ether), or combinations thereof. It is noted that oxygenates containing at least one $C_1$-$C_4$ alkyl group are intended to explicitly identify oxygenates having alkyl groups containing about 4 carbons or less. Preferably the oxygenate feed can include at least about 50 wt % of one or more suitable oxygenates, such as at least about 75 wt %, or at least about 90 wt %, or at least about 95 wt %. Additionally or alternatively, the oxygenate feed can include at least about 50 wt % methanol, such as at least about 75 wt % methanol, or at least about 90 wt % methanol, or at least about 95 wt % methanol. The oxygenate feed can be derived from any convenient source. For example, the oxygenate feed can be formed by reforming of hydrocarbons in a natural gas feed to form synthesis gas ($H_2$, CO, $CO_2$), and then using the synthesis gas to form alcohols.

In some aspects, such as aspects related to oxygenate conversion using an MFI or MEL framework catalyst, the yield of aromatics relative to the total hydrocarbon product can be about 35 wt % to about 60 wt %, or about 38 wt % to about 60 wt %, or about 40 wt % to about 52 wt %, or about 38 wt % to about 45 wt %. For example, the yield of aromatics relative to the total hydrocarbon product can be at least about 35 wt %, or at least about 38 wt %, or at least about 40 wt %, or at least about 45 wt %. Additionally or alternatively, the yield of aromatics relative to the total hydrocarbon product can be about 60 wt % or less, or about 55 wt % or less, or about 52 wt % or less, or about 50 wt % or less.

In various aspects, the yield of olefins relative to the total hydrocarbon product can be about 2.0 wt % to about 30 wt %, or about 2.0 wt % to 25 wt %, or about 5.0 wt % to about 20 wt %, or about 10 wt % to about 20 wt %. For example, the yield of olefins relative to the total hydrocarbon product can be at least about 2.0 wt %, or at least about 5.0 wt %, or at least about 10 wt %. Additionally or alternatively, the yield of olefins relative to the total hydrocarbon product can be about 30 wt % or less, or about 25 wt % or less, or about 20 wt % or less. In various aspects, the yield of paraffins relative to the total hydrocarbon product can be about 20 wt % to about 45 wt %, or about 20 wt % to about 35 wt %, or about 25 wt % to about 45 wt %, or about 25 wt % to about 40 wt %. For example, the yield of paraffins relative to the total hydrocarbon product can be at least about 20 wt %, or at least about 25 wt %, or at least about 30 wt % and/or the yield of paraffins relative to the total hydrocarbon product can be about 45 wt % or less, or about 40 wt % or less, or about 35 wt % or less. In the claims below, the relative amounts of paraffins, olefins, and aromatics in a sample can be determined based on ASTM D6839. For the paraffins and olefins generated during oxygenate conversion, at least 50 wt % of the olefins can correspond to $C_3$ and $C_4$ olefins and/or at least 50 wt % of the paraffins can correspond to $C_3$ and $C_4$ paraffins. Additionally or alternatively, less than 10 wt % of the paraffins can correspond to $C_1$ paraffins (methane).

In some aspects, such as aspects related to oxygenate conversion using an MRE framework catalyst, the yield of aromatics relative to the total hydrocarbon product can be about 5 wt % to about 30 wt %, or about 10 wt % to about 30 wt %, or about 10 wt % to about 25 wt %, or about 5 wt % to about 20 wt %. For example, the yield of aromatics relative to the total hydrocarbon product can be at least about 5 wt %, or at least about 10 wt %, or at least about 15 wt %. Additionally or alternatively, the yield of aromatics relative to the total hydrocarbon product can be about 30 wt % or less, or about 25 wt % or less, or about 20 wt % or less. In various aspects, the yield of olefins relative to the total hydrocarbon product can be about 20 wt % to about 60 wt %, or about 25 wt % to 60 wt %, or about 20 wt % to about 40 wt %, or about 25 wt % to about 50 wt %. For example, the yield of olefins relative to the total hydrocarbon product can be at least about 20 wt %, or at least about 25 wt %, or at least about 30 wt %. Additionally or alternatively, the yield of olefins relative to the total hydrocarbon product can be about 60 wt % or less, or about 50 wt % or less, or about 40 wt % or less. In various aspects, the yield of paraffins relative to the total hydrocarbon product can be about 20 wt % to about 50 wt %, or about 20 wt % to about 35 wt %, or about 25 wt % to about 45 wt %, or about 25 wt % to about 40 wt %. For example, the yield of paraffins relative to the total hydrocarbon product can be at least about 20 wt %, or at least about 25 wt %, or at least about 30 wt % and/or the yield of paraffins relative to the total hydrocarbon product can be about 50 wt % or less, or about 45 wt % or less, or about 40 wt % or less, or about 35 wt % or less. For the paraffins and olefins generated during oxygenate conversion, at least 50 wt % of the olefins can correspond to $C_3$ and $C_4$ olefins and/or at least 50 wt % of the paraffins can correspond to $C_3$ and $C_4$ paraffins. Additionally or alternatively, less than 10 wt % of the paraffins can correspond to $C_1$ paraffins (methane).

The total hydrocarbon product in the conversion effluent can include a naphtha boiling range portion, a distillate fuel boiling range portion, and a light ends portion. Optionally but preferably, the conversion effluent can include less than 1.0 wt % of compounds boiling above the distillate fuel boiling range (371° C.+). Optionally, the conversion effluent can have a final boiling point of 371° C. or less. The selectivity for forming/yield of a naphtha boiling range portion can be at least about 35 wt % and/or about 70 wt % or less. For example, the selectivity for forming/yield of a naphtha boiling range portion can be about 35 wt % to 65 wt %, or 40 wt % to 65 wt %, or 40 wt % to 60 wt %, or 45 wt % to 65 wt %.

The naphtha boiling range portion formed from a conversion process can have an octane rating of at least 91, or at least 95, or at least 97, or at least 100, or at least 102, or at least 105, such as up to 110. In particular, in aspects involving an MFI or MEL framework catalyst, the octane rating can be 95 to 110, or 97 to 110, or 100 to 110. Additionally or alternately, in aspects involving a MRE framework catalyst, the octane rating can be 91 to 97. As defined above, the octane rating is corresponds to (RON+MON)/2).

Suitable and/or effective conditions for performing a conversion reaction can include average reactor temperatures of about 440° C. to about 550° C. (or about 475° C. to about 550° C., or about 450° C. to about 500° C.), total pressures between about 10 psig (6.9 kPag) to about 180 psig (~1200 kPaa), and an oxygenate space velocity between about 0.1 h$^{-1}$ to about 10 h$^{-1}$ based on weight of oxygenate relative to weight of catalyst. For example, the average reactor temperature can be at least about 450° C., or at least about 475° C., or at least about 500° C. Additionally or alternately, the temperature can be about 550° C. or less, such as about 525° C. or less, or about 500° C. or less. In this discussion, average reactor temperature is defined as the average of the temperature of the reactor at the reactor inlet and the temperature of the reactor at the reactor outlet.

Optionally, a portion of the conversion effluent can be recycled for inclusion as part of the feed to the conversion reactor. For example, at least a portion of the light ends from the conversion effluent can be recycled as part of the feed. The recycled portion of the light ends can correspond to any convenient amount, such as 25 wt % to 75 wt % of the light ends. Recycling of light ends can provide olefins, which can serve as an additional reactant in the conversion reaction, as well as providing a mechanism for temperature control.

Various types of reactors can provide a suitable configuration for performing a conversion reaction. Suitable reactors can include fixed bed reactors (such as trickle bed reactors), moving bed reactors (such as riser reactors), and fluidized bed reactors. It is noted that the activity and/or selectivity of a catalyst for oxygenate conversion can vary as the catalyst is exposed to increasing amounts of oxygenate feed. This modification of the catalyst activity is believed to be due to the formation of coke on the catalyst. When oxygenate conversion is performed in a fixed bed reactor, calculating the average catalyst exposure time can be straightforward, as the amount of oxygenate introduced into the reactor can be compared with the amount of conversion catalyst in the reactor. This can be used to calculate an average catalyst exposure time as a ratio of the grams of oxygenate (such as methanol) exposed to the catalyst divided by the grams of catalyst.

The modification of the catalyst activity and/or selectivity with increasing average catalyst exposure time can be reversed at least in part by regenerating the catalyst. In some aspects, a full regeneration can be performed on a catalyst, so that the average amount of coke present on the regenerated catalyst is less than 0.1 wt %. In other aspects, a partial regeneration can be performed, so that the average amount of coke present on the regenerated catalyst after regeneration is greater than 0.1 wt %. The average amount of coke present on a catalyst sample can be readily determined by thermogravimetric analysis.

In aspects where a catalyst can be withdrawn from the reactor for regeneration and recycle during operation of the reactor, such as a moving bed reactor and/or fluidized bed reactor, catalyst can be withdrawn and replaced with make-up (fresh) and/or regenerated catalyst. It is noted that withdrawing catalyst from the reactor for regeneration is distinct from removing catalyst entirely from the reaction system and replacing the removed catalyst with fresh make-up catalyst. In this discussion, when full regeneration is performed on a catalyst (less than 0.1 wt % average coke remaining on the regenerated catalyst), the average catalyst exposure time for the regenerated catalyst is defined to be zero for purposes of determining average catalyst exposure time for catalyst within the reactor. In such aspects when full regeneration is being performed, the average catalyst exposure time for catalyst being exposed to oxygenate can be determined based on a) the flow rate of oxygenate into the reactor relative to the amount of catalyst in the reactor, and b) the average residence time of the catalyst in the reactor. These values can allow for a determination of the average grams of oxygenate per gram of catalyst in the reactor (i.e., the average catalyst exposure time).

In a moving bed reactor, the residence time for catalyst can correspond to the amount of time required for a catalyst particle to travel the length of the bed to the exit, based on the average velocity of the moving bed. As an example, the flow of methanol into a moving bed reactor can correspond to a space velocity of 1.0 hr$^{-1}$, which means 1 g of methanol per g of catalyst per hour. In such an example, if the average residence time for catalyst in the reactor is 48 hours (based on the average velocity of the moving bed relative to the size of the bed), then the average catalyst exposure time for catalyst in the moving bed would be 24 g of methanol per g of catalyst. Similarly, in aspects involving a fluidized bed, the catalyst residence time can be determined based on the rate of removal of catalyst from the reactor for regeneration. The catalyst residence time can correspond to the amount of time required to remove an amount of catalyst that is equivalent to the weight of the catalyst bed. Based on that residence time, the average catalyst exposure time can be calculated in a similar manner to the calculation for a moving bed.

During a partial regeneration, a catalyst can be exposed to an oxidizing environment for removal of coke from the catalyst, but the net amount of coke remaining on the catalyst after partial regeneration can be greater than 0.1 wt %. When a partial regeneration is performed, the effective average catalyst exposure time for the catalyst after regeneration will be a value other than zero, due to the amount of remaining coke on the catalyst. When a partial regeneration is performed, the amount of coke removal can roughly scale in a linear manner with the effective average catalyst exposure time of the partially regenerated catalyst. In this discussion and the claims below, when a catalyst is partially regenerated, the average catalyst exposure time for the partially regenerated catalyst is determined by multiplying the average catalyst exposure time prior to regeneration by the wt % of coke remaining on the catalyst after partial regeneration. As an example, a hypothetical catalyst may have an exposure time of 100 g methanol per g catalyst prior to regeneration. In this example, partial regeneration is used to remove 60 wt % of the coke on the catalyst. This means that 40 wt % (or 0.4 expressed as a fraction) of the coke remains on the catalyst after regeneration. In such an example, the average catalyst exposure time for the regenerated catalyst would be 0.4×100=40 g methanol per g catalyst.

In aspects where partial regeneration is performed, the calculation for the average catalyst exposure time for catalyst in the reactor can be modified based to account for the fact that any recycled catalyst will have a non-zero initial value of catalyst exposure time. The same calculation described above can be used to determine an initial value. The non-zero catalyst exposure time for the regenerated catalyst can then be added to the initial value to determine the average catalyst exposure time within the reactor. In the example noted above, if the average catalyst exposure time for partially regenerated catalyst is 10 g methanol per g catalyst, and if the amount of average exposure within the reactor is 24 g methanol per g catalyst as calculated above, then the average catalyst exposure time for the system when using partial regeneration would be 34 g methanol per g catalyst. It is also noted that a portion of the catalyst introduced into a reactor may correspond to fresh make-up catalyst instead of partially regenerated catalyst. In such aspects, the catalyst exposure time for the catalyst introduced into the reactor can be a weighted average of the fresh make-up catalyst (zero exposure time) and the catalyst exposure time for the partially regenerated catalyst.

For a catalyst including an MFI (or optionally MEL) framework zeolite, the catalyst recycle rate can be dependent on the desired products, with catalyst recycle rates that produce an average catalyst exposure time/average cycle length for catalyst in the reactor of about 1 g $CH_3OH$/g catalyst to about 2000 g $CH_3OH$/g catalyst potentially being suitable, or about 50 g $CH_3OH$/g catalyst to about 1000 g $CH_3OH$/g catalyst, or about 100 g $CH_3OH$/g catalyst to about 1500 g $CH_3OH$/g catalyst, or about 100 g $CH_3OH$/g catalyst to about 1000 g $CH_3OH$/g catalyst. The target average catalyst exposure time can be dependent on the specific nature of the catalyst and/or the desired product mix. In some aspects where shorter average catalyst exposure times are desired, the average catalyst exposure time can be about 1 g $CH_3OH$/g catalyst to about 200 g $CH_3OH$/g catalyst, or about 5 g $CH_3OH$/g catalyst to about 150 g $CH_3OH$/g catalyst, or about 1 g $CH_3OH$/g catalyst to about 100 g $CH_3OH$/g catalyst. In other aspects where longer times are desired, the average catalyst exposure time can be about 200 g $CH_3OH$/g catalyst to about 2000 g $CH_3OH$/g catalyst, or about 400 g $CH_3OH$/g catalyst to about 1500 g $CH_3OH$/g catalyst, or about 500 g $CH_3OH$/g catalyst to about 1000 g $CH_3OH$/g catalyst. The above average catalyst exposure times can be achieved, for example, by withdrawing about 0.01 wt % to about 3.0 wt % of catalyst per 1 g of methanol exposed to a g of conversion catalyst, or about 0.01 wt % to about 1.5 wt %, or about 0.1 wt % to about 3.0 wt %, or about 1.0 wt % to about 3.0 wt %. It is noted that these withdrawal rates could be modified, for example, if only a partial regeneration is performed on withdrawn catalyst. For catalysts other than MFI framework catalysts, a catalyst recycle rate can be selected to produce an average catalyst exposure time/average cycle length for catalyst in the reactor of about 25 g $CH_3OH$/g catalyst to about 200 g $CH_3OH$/g catalyst, or about 25 g $CH_3OH$/g catalyst to about 180 g $CH_3OH$/g catalyst, or about 50 g $CH_3OH$/g catalyst to about 180 g $CH_3OH$/g catalyst, or about 50 g $CH_3OH$/g catalyst to about 150 g $CH_3OH$/g catalyst, or about 25 g $CH_3OH$/g catalyst to about 100 g $CH_3OH$/g catalyst, or about 50 g $CH_3OH$/g catalyst to about 100 g $CH_3OH$/g catalyst, or about 100 g $CH_3OH$/g catalyst to about 180 g $CH_3OH$/g catalyst, or about 100 g $CH_3OH$/g catalyst to about 150 g $CH_3OH$/g catalyst. The appropriate cycle length for a catalyst including a non-MFI framework zeolite can depend on the type of zeolite.

It is noted that the oxygenate feed and/or conversion reaction environment can include water in various proportions. Conversion of oxygenates to aromatics and olefins results in production of water as a product, so the relative amounts of oxygenate (such as methanol or dimethyl ether) and water can vary within the reaction environment. Based on the temperatures present during methanol conversion, the water in the reaction environment can result in "steaming" of a catalyst. Thus, a catalyst used for conversion of oxygenates to aromatics is preferably a catalyst that substantially retains activity when steamed. Water may also be present in a feed prior to contacting the zeolite catalyst. For example, in commercial processing of methanol to form gasoline, in order to control heat release within a reactor, an initial catalyst stage may be used to convert a portion of the methanol in a feed to dimethyl ether and water prior to contacting a zeolite catalyst for forming gasoline.

Feedstock and Products—Olefin Oligomerization

In various aspects, catalysts described herein can be used for oligomerization of olefin-containing feeds to heavier molecular weight and/or higher boiling products. An example of a target molecular boiling range for oligomerized products can be to form products in the distillate fuel boiling range. An oligomerization process suitable for forming distillate fuel boiling range products can often also form naphtha boiling range products and 700° F.+ (371° C.+) products. Examples of suitable olefin-containing feeds include feeds containing $C_2$ olefins, $C_3$ olefins, $C_4$ olefins, $C_5$ olefins, and combinations thereof. More generally, any olefins generated during a methanol conversion process can generally be suitable for oligomerization. However, because $C_5$ and larger olefins can also serve as valuable components in a high octane naphtha fraction, the olefins used for oligomerization can tend to correspond to $C_2$-$C_4$ olefins.

The olefin content of an olefin-containing feed can vary depending on the yield of olefins from a prior oxygenate conversion process. The overall yield of olefins in the effluent from an oxygenate conversion process can be from about 1 wt % to about 60 wt % (or possibly more). However, since there are substantially no aromatic compounds in the light ends portion of the conversion effluent, the relative proportion of olefins in the light ends can be higher. As a result, the amount of olefins in a light ends fraction can be comparable to the amount of paraffins, or even roughly twice as large as the amount of paraffins. For example, the wt % of olefins in the $C_1$-$C_4$ fraction (light ends) of the conversion effluent can be about 25 wt % to about 70 wt %, or about 25 wt % to about 65 wt %, or about 30 wt % to about 55 wt %, or about 30 wt % to about 45 wt %. Typically the remaining portion of the $C_1$-$C_4$ light ends fraction can correspond to various types of paraffins. Optionally, an additional olefin-containing feed separate from any olefins generated during oxygenate conversion can also be introduced into the oligomerization reaction environment.

The total hydrocarbon product in the oligomerization effluent can include (at least) a naphtha boiling range portion, a distillate fuel boiling range portion, and a 371° C.+ portion. In various aspects, the selectivity for forming a distillate fuel boiling range portion can be about 55 wt % to about 75 wt % of the total hydrocarbon product, or about 55 wt % to about 70 wt %, or about 55 wt % to about 65 wt %, or about 60 wt % to about 70 wt % or less. Additionally or alternately, the selectivity for forming/yield of a naphtha boiling range portion can be about 15 wt % to about 40 wt %, or 15 wt % to 30 wt %, or 15 wt % to 25 wt %. With regard to the 371° C.+ fraction, the selectivity for forming/yield of 371° C.+ compounds can be about 1 wt % to about 12 wt %, although for 1-D 10-member ring zeolites such as ZSM-48, the selectivity/yield can be about 12 wt % to about 25 wt %. Optionally, a portion of the naphtha boiling range product and/or a portion of any light ends can be recycled back to the conversion process, to the oligomerization process, or a combination thereof.

The distillate boiling range portion of the oligomerization effluent can have a cetane rating of at least 42, or at least 43, and optionally up to about 48 or more. The 371° C.+ portion can have a still higher cetane rating, such as at least about 50, or at least 52, or at least 55, or at least 57. The aromatics content of the distillate boiling range portion can be 1.0 wt % or less, or 0.5 wt % or less, as determined by ASTM D5186. The naphtha boiling range portion formed from an oligomerization process can have an octane rating of about 80 to about 90.

Suitable and/or effective conditions for performing an oligomerization reaction can include average reactor temperatures of about 125° C. to about 250° C. (or about 125° C. to about 200° C., or about 150° C. to about 220° C.), total pressures between about 100 psig (~690 kPag) to about 1000 psig (~6900 kPag), or about 70 psig (~500 kPag) and 180 psig (~1200 kPag) and an oxygenate space velocity between about 0.1 $h^{-1}$ to about 5 $h^{-1}$ based on weight of olefins relative to weight of catalyst. The lower pressure operating range for oligomerization can be beneficial for performing oligomerization on an olefin-containing portion of an oxygenate conversion effluent without having to perform prior compression on the portion of the conversion effluent.

Various types of reactors can provide a suitable configuration for performing an oligomerization reaction. Suitable reactors can include fixed bed reactors (such as trickle bed reactors), moving bed reactors, and fluidized bed reactors (such as riser reactors). In aspects where a catalyst can be removed from the reactor for regeneration and recycle during operation of the reactor, such as a moving bed reactor and/or fluidized bed reactor, catalyst can be removed and replaced with regenerated catalyst.

Example of Reaction System Configuration

FIG. 1 shows an example of a reaction system configuration for performing oxygenate conversion and olefin oligomerization to form a high octane (greater than 95 octane rating) naphtha boiling range product and a distillate boiling range product with a cetane rating of at least about 40. It is noted that the reactors shown in FIG. 1 are depicted as fixed bed, downflow reactors (such as trickle-bed reactors) for convenience. It is understood that any or all of the reactors shown in FIG. 1 can alternatively be moving bed reactors and/or fluidized bed reactors. In FIG. 1, a feed 105 can correspond to an oxygenate-containing feed. In a particular example, feed 105 can correspond to 96 wt % methanol and 4 wt % water. Optionally, other gases can also be introduced as part of feed 105, such as nitrogen (as a diluent) or hydrogen. Optionally, feed 105 can be introduced into a reactor as a plurality of input flows, such as a first input flow containing a mixture of methanol and water and a second input flow containing a mixture of nitrogen and hydrogen.

The feed 105 can optionally be introduced into an initial dehydration reactor 110. Initial dehydration reactor 110 can include an acidic catalyst, such as an acidic alumina catalyst, that can facilitate an equilibrium reaction between methanol, water, and dimethyl ether. This can result in production of an effluent 115 that includes both methanol and dimethyl ether. Those of skill in the art will recognize that dimethyl ether and methanol can often be used in similar manners when performing an oxygenate conversion reaction. The dehydration of methanol to form dimethyl ether is highly exothermic. By performing an initial dehydration, the amount of heat generated in the conversion reactor(s) can be reduced, which can allow for improved temperature control in the conversion reactor. Optionally, a portion of the oxygenate feed 105 can bypass the dehydration reactor and can be input directly into conversion reactor 120. In aspects where other oxygenates are used as a feed, such as $C_{2+}$ alcohols or larger ethers, dehydration reactor can be omitted so that feed 105 is an input flow for conversion reactor 120.

The feed 105 and/or the effluent 115 containing both dimethyl ether and methanol is then passed into conversion reactor 120. The input to conversion reactor 120 can be exposed to a conversion catalyst under effective conditions for forming a conversion effluent 125. The conversion effluent 125 can then be separated, such as by using a 3 phase separator 130. One phase generated by separator 130 can be an aqueous phase 133 that includes a substantial majority of the water present within the conversion effluent 125. Another phase generated by separator 130 can correspond to a hydrocarbon liquid product 137. The hydrocarbon liquid product can correspond to naphtha and distillate fuel boiling range compounds formed during the conversion reaction. Optionally, the hydrocarbon liquid product can include a portion of hydrocarbon-like compounds that include one or more heteroatoms, such as oxygen, sulfur, nitrogen, and/or other heteroatoms that are commonly found in petroleum or bio-derived feeds.

A third phase generated by separator 130 can correspond to a hydrocarbon gas product 135. The hydrocarbon gas product 135 can include $C_{4-}$ compounds corresponding to light paraffins and light olefins. In the configuration shown in FIG. 1, the hydrocarbon gas product can be used as the feed for oligomerization reactor 140 to produce oligomerized hydrocarbon product 145. Oligomerized hydrocarbon product 145 can optionally be separated to form desired product fractions, such as a naphtha boiling range product, a distillate fuel boiling range product, and a 371° C.+ product. Optionally, a recycle portion 122 of hydrocarbon gas product 135 can be recycled as part of the input flows to conversion reactor 120. It is noted that the amount of recycle portion 122 relative to hydrocarbon gas product 135 can be controlled to allow for flexibility in the yield of various products. For example, increasing the relative flow of optional recycle portion 122 can increase the amount high octane naphtha boiling range product present in hydrocarbon liquid product 137. Similarly, decreasing the relative flow of optional recycle portion 122 (including eliminating the recycle) can increase the amount of oligomerized hydrocarbon product 145, resulting in greater production of distillate boiling range compounds. In some configurations where the amount of recycle portion 122 is sufficiently large, a bleed or waste flow (not shown) can also be present to reduce or minimize the build-up of $C_{4-}$ paraffins in conversion reactor 120.

The following examples provide description of processes for performing oxygenate conversion and processes for performing olefin oligomerization. In order to fully characterize the effluents from each reaction phase, the oxygenate conversion processes and olefin oligomerization processes were run separately. However, it is believed that substantially similar results can be achieved by integrating the processes, such as by using at least a portion of the light ends effluent from oxygenate conversion as the feed (or as at least part of the feed) for olefin oligomerization.

Example 1—Methanol Conversion Using P/Zn-ZSM-5

The conversion catalyst used in this example was based on small crystal, self-bound MFI framework (ZSM-5) zeolite. The ZSM-5 had a silicon to aluminum ratio of 20 to 40 and an Alpha value of at least 100. After making an H-form extrudate of the self-bound zeolite, Zn and P were added via aqueous impregnation of $Zn(NO_3)_2$ and $H_3PO_4$. Sufficient amounts of Zn and P were added to produce a catalyst with about 1.0 wt % loading of each of Zn and P. This catalyst can be referred to as a P/Zn-ZSM-5 catalyst. The Zn and P were added by serial impregnation (Zn first), but in other aspects co-impregnation may be used. More generally, in various aspects other promoters from Groups 6-15 of the IUPAC periodic table may be used in place of and/or in addition to Zn and P.

The conversion catalyst was tested in an adiabatic fixed-bed reactor with recycle of the produced light gas back into the reactor. The reactor configuration was similar to FIG. 1, but all of the hydrocarbon gas product 135 was used for recycle stream 122. The feed into the dehydration reactor corresponded to 96 wt % methanol and 4 wt % water. The flow rate was sufficient to produce a liquid hourly space velocity of 1.66 $h^{-1}$ based on the weight of catalyst in the (second) conversion reactor. The dehydration reactor included an acidic alumina catalyst to dehydrate the methanol into an equilibrium mixture of methanol, water, and dimethyl ether. The equilibrium mixture was then passed into the conversion reactor, which contained the P/Zn-ZSM-5 catalyst described above. The effluent from the conversion reactor corresponded to a mixture including water, olefins, paraffins, aromatics, and hydrogen. The heavy portion of the reactor product, mainly $C_{5+}$ and water, was removed in a vapor-liquid separator. The remaining light gasses were recycled to the inlet of the conversion reactor. The reaction conditions were chosen to manage the adiabatic temperature rise of the reactor and the composition of the final product.

Table 1 shows the reaction conditions that were tested. The columns starting with "MTA1" corresponded to tests performed starting with fresh catalyst. The catalyst was then regenerated and exposed to the feed under the "MTA2" conditions. In between the MTA1 and MTA2 conditions, an oxidative catalyst regeneration was performed to remove coke from the catalyst. Inlet T and Outlet T refer to the temperatures at the inlet and outlet of the conversion reactor. The pressure and WHSV also refer to conditions in the conversion reactor. In two of the tests, an additional diluent flow of $N_2$ was added. For MTA2-2, about 5 mol % of the fresh feed to the reactor corresponded to $N_2$, with the rest of the feed corresponding to the methanol/water mixture. However, because of buildup of $N_2$ due to (essentially) full recycle of the hydrocarbon gas stream, the net $N_2$ content in the feed into the reactor was about 24 mol % (corresponds to roughly 22 wt %). For MTA2-3, about 8.5 mol % of the fresh feed corresponded to $N_2$, which resulted in a net or total content of $N_2$ in the feed of about 40 mol % (corresponds to roughly 36 wt %).

TABLE 1

Test conditions for conversion in presence of P/Zn-ZSM-5

|  | MTA1-1 | MTA1-2 | MTA1-3 | MTA2-1 | MTA2-2 | MTA2-3 | MTA2-4 |
| --- | --- | --- | --- | --- | --- | --- | --- |
| Inlet T (° C.) | 400 | 400 | 450 | 400 | 400 | 450 | 450 |
| Outlet T (° C.) | 500 | 500 | 525 | 500 | 500 | 525 | 525 |
| Pressure (kPag) | ~1000 | ~1000 | ~1000 | ~1000 | ~500 | ~500 | ~500 |
| WHSV ($hr^{-1}$) | 2.0 | 1.0 | 1.0 | 2.0 | 2.0 | 1.0 | 1.0 |
| $N_2$ flow | 0 | 0 | 0 | 0 | yes | yes | 0 |

Figure 2:
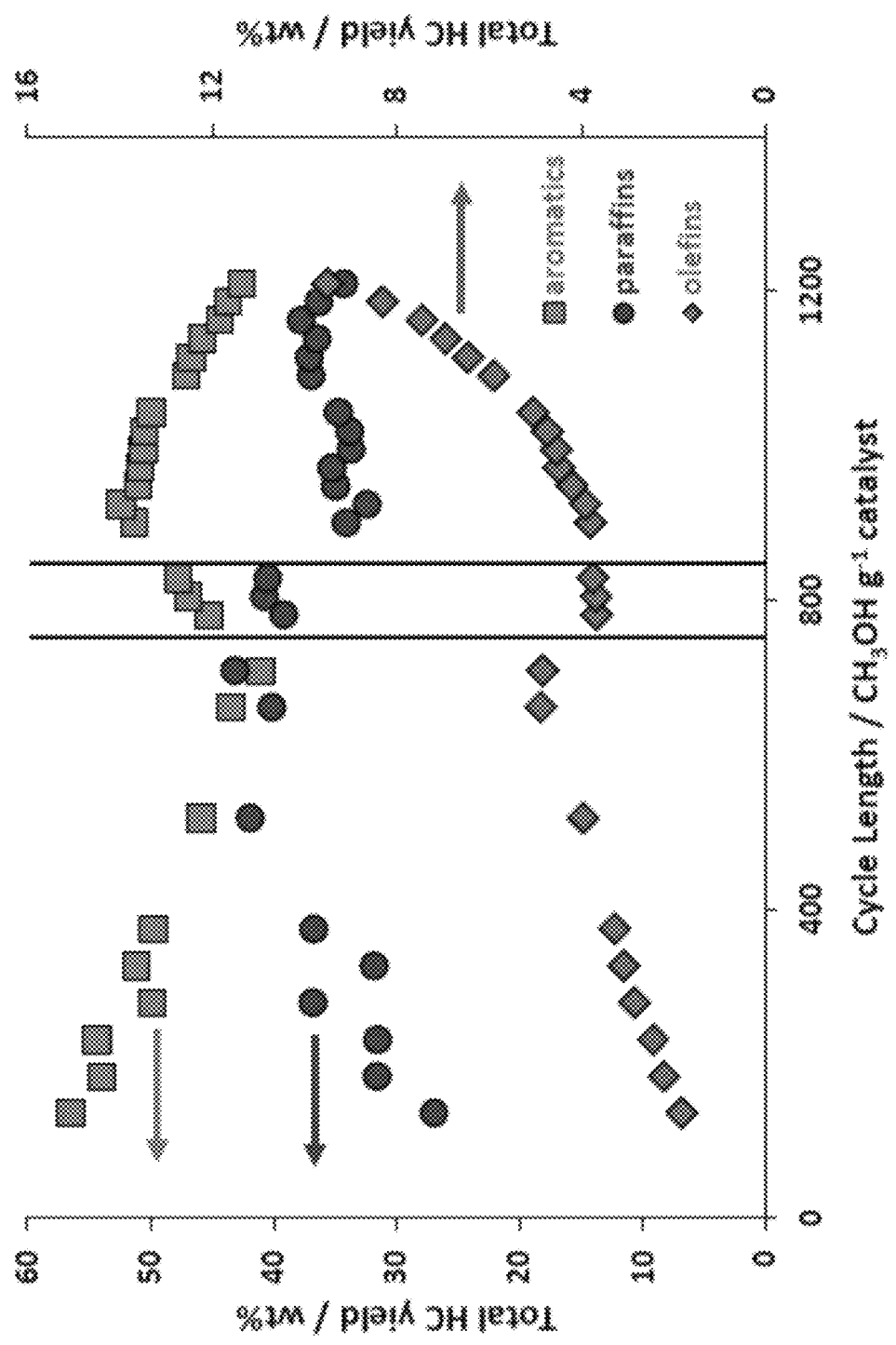
FIG. 2 shows relative yields from conversion of methanol and methanol plus 1-pentene in the presence of a 1 wt % Zn-ZSM-5 catalyst.
Figure 3:
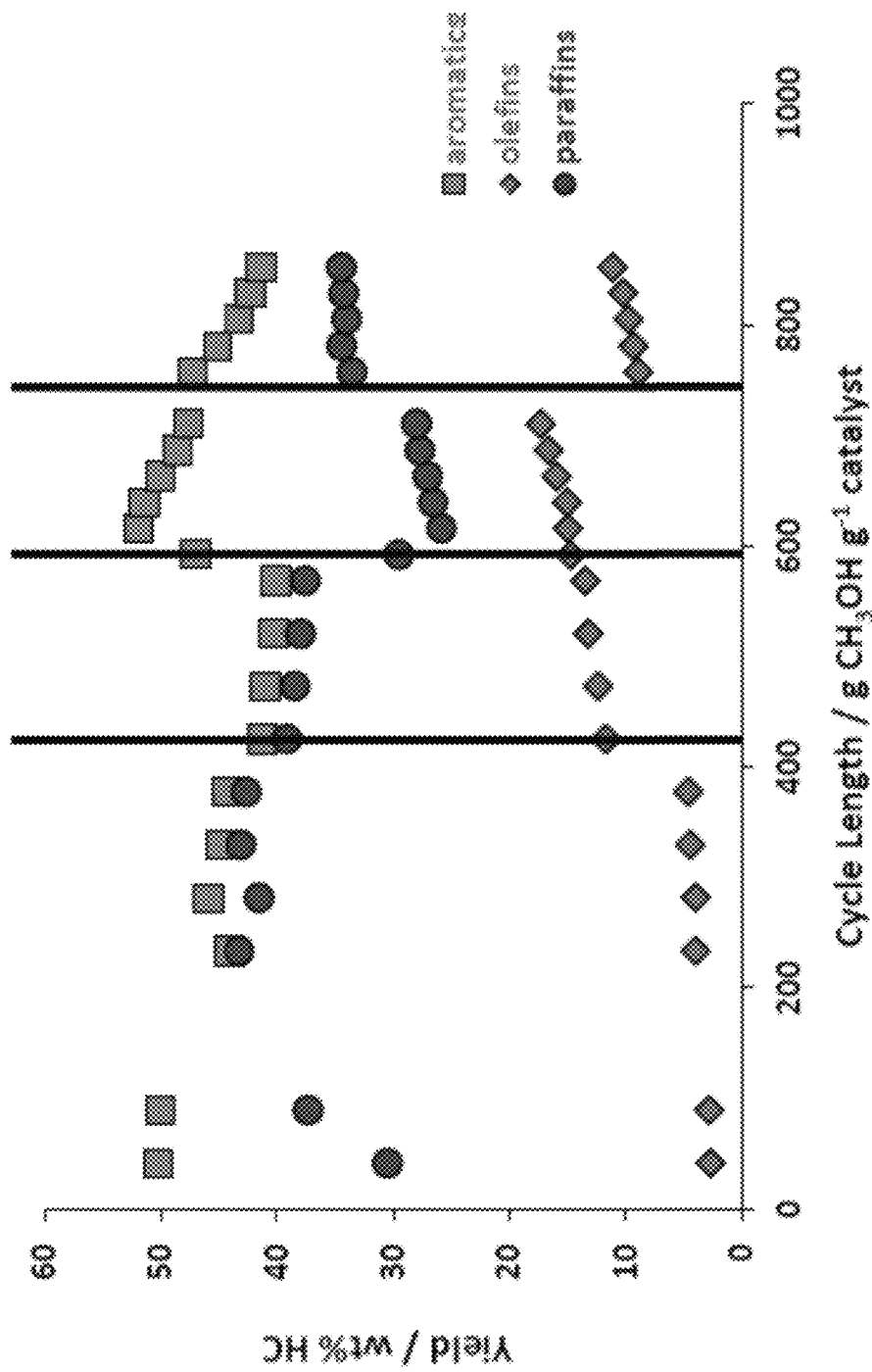
FIG. 3 shows results from conversion of methanol at various temperatures in the presence of a ZSM-5 catalyst.

FIG. 2 shows the product distribution for the total hydrocarbon product from the MTA1 tests, corresponding to conditions MTA1-1, MTA1-2, and MTA1-3 in Table 1. In FIG. 3, the squares correspond to aromatic yield, the circles correspond to paraffin yield, and the diamonds correspond to olefin yield. As shown in FIG. 2, the yield of aromatics was generally between 40 wt % and 60 wt % of the total hydrocarbon product. The amount of paraffins ranged from roughly 30 wt % to roughly 45 wt %. It is noted that about 60 wt % of the paraffins corresponded to $C_3$ and $C_4$ paraffins, while another 20 wt % of the paraffins corresponded to $C_{5+}$ paraffins that could be included as part of a naphtha boiling range product. Toward the end of the MTA1-3 test condition, where the cycle length was greater than 1000 grams of methanol per gram of catalyst, the amount of olefins produced started to increase sharply from the roughly 5 wt % to 15 wt % observed early in the tests to upward of 20 wt % or even 30 wt %. This late increase in olefin selectivity appeared to come at the expense of aromatic selectivity.

FIG. 3 provides a product distribution for the MTA2 tests similar to the product distribution shown in FIG. 2. MTA2-1 represents a test condition similar to MTA1-1, to allow for comparison of catalyst activity between fresh catalyst and regenerated catalyst. The olefin selectivity for MTA2-1 was slightly lower than the olefin selectivity for MTA1-1, but otherwise the product selectivities were similar for use of fresh and regenerated catalyst under similar conditions. This demonstrates that the catalyst can be effectively regenerated to a condition similar to original activity. It is noted that the addition of diluent at the lower reactor pressure (~500 kPag) in test condition MTA2-3 resulted in a reduction in paraffin selectivity in favor of production of aromatics and olefins.

Further analysis was performed on the total hydrocarbon product from test MTA2-3 to determine the relative distribution of olefins and paraffins in the lighter portions of the effluent. As shown in FIG. 3, test condition MTA2-3 resulted in production of roughly 20 wt % olefins and roughly 30 wt % paraffins. The first column in Table 2 shows the selectivity for each carbon number of olefin ($C_2$ to $C_6$) within the olefins produced at test condition MTA-3. For example, within the 20 wt % of olefins produced at test condition MTA2-3, about 39 wt % corresponded to $C_3$ olefins and about 26 wt % corresponded to $C_4$ olefins. Similarly, the second column in Table 2 shows the selectivity for each carbon number of paraffin ($C_1$ to $C_6$) within the paraffins produced at test condition MTA2-3.

TABLE 2

Olefin vs Paraffin Selectivity

| | Olefin | Paraffin |
|---|---|---|
| C1 | | 9 |
| C2 | 19 | 9 |
| C3 | 39 | 37 |
| C4 | 26 | 27 |
| C5 | 13 | 14 |
| C6 | 3 | 5 |

Additional characterization of products was performed for the effluents from test runs MTA1-1, MTA1-3, and MTA2-3. Table 3 shows the naphtha boiling range product yield, octane rating for the naphtha boiling range product, and distillate fuel boiling range product yield for the effluents from runs MTA1-1, MTA1-3, and MTA2-3. As shown in Table 3, all of the naphtha products had octane ratings of at least 95 and provided naphtha yields of at least 55 wt % relative to the weight of the total hydrocarbon product in the conversion effluent. It is noted that Table 3 also includes a "distillate yield" for each condition. The distillate yields in Table 3 do not represent distillate that was made during the test condition, as the amount of distillate produced during the conversion reaction was essentially 0. Instead, the "distillate yield" values in Table 3 represent the amount of olefins generated that exited from the reactor with the liquid product. These olefins would be suitable for oligomerization in a subsequent oligomerization step, and therefore represented a potential distillate yield at each condition.

TABLE 3

Conversion Effluent Fuel Yields

| | Naphtha yield (wt %) | Octane: (RON + MON)/2 | "Distillate yield" (wt %) |
|---|---|---|---|
| MTA1-1 | ~60 | >100 | ~1 |
| MTA1-3 | ~55 | >95 | ~8 |
| MTA2-3 | ~55 | >97 | ~15 |

Example 2—Influence of Type of Conversion Catalyst on Conversion Reaction

In this example, self-bound ZSM-5 similar to the catalyst in Example 1, but without Zn or P as promoters, was tested along with several other conversion catalysts. The additional catalysts corresponded to self-bound ZSM-48 with a roughly 45 to 1 silicon to aluminum ratio; self-bound ZSM-48 dopes with $Y_2O_3$; alumina bound ITQ-13; and self-bound ZSM-5 with 0.5 wt % Zn as a promoter. The catalysts were investigated in an apparatus similar to the apparatus used in Example 1, but without the light gas recycle. Instead, the apparatus for Example 2 was configured as an isothermal reactor. The feed was similar to the feed in Example 1, and the reactor conditions included a reactor temperature of 450° C., a reactor pressure of ~100 kPag, and a WHSV of about 2.0 $hr^{-1}$.

Figure 4:
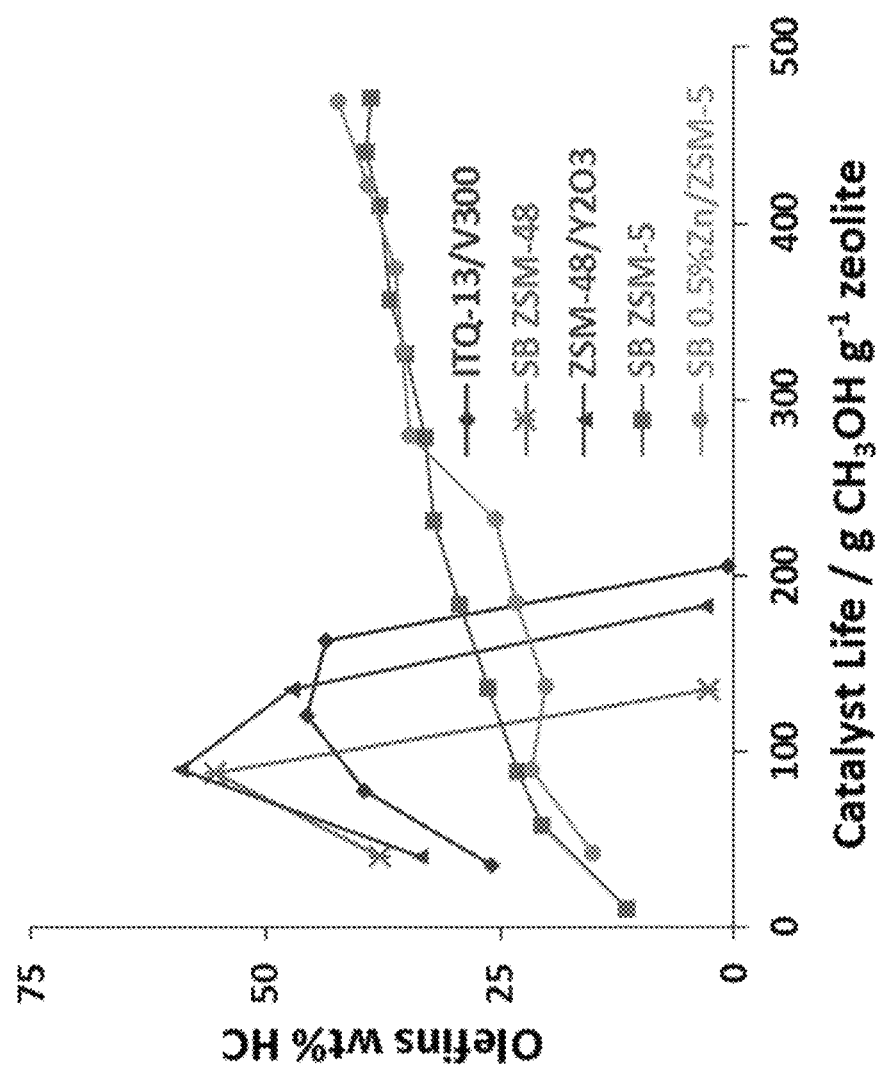
FIG. 4 shows results from conversion of methanol and 1-pentene at various temperatures in the presence of a ZSM-5 catalyst.

FIG. 4 shows the olefin selectivity as a function of cycle length for the tests with each catalyst. As shown in FIG. 4, the self-bound ZSM-5 catalysts (both without promoter and with 0.5 wt % Zn) provided stable activity over the full cycle length that was investigated. By contrast, the other types of catalysts provided increased selectivity at low cycle lengths, ranging from fresh (or freshly regenerated) catalyst to about 100 or 200 grams of methanol per gram of catalyst. At longer cycle lengths, however, the olefin selectivity dropped dramatically.

Figure 5:
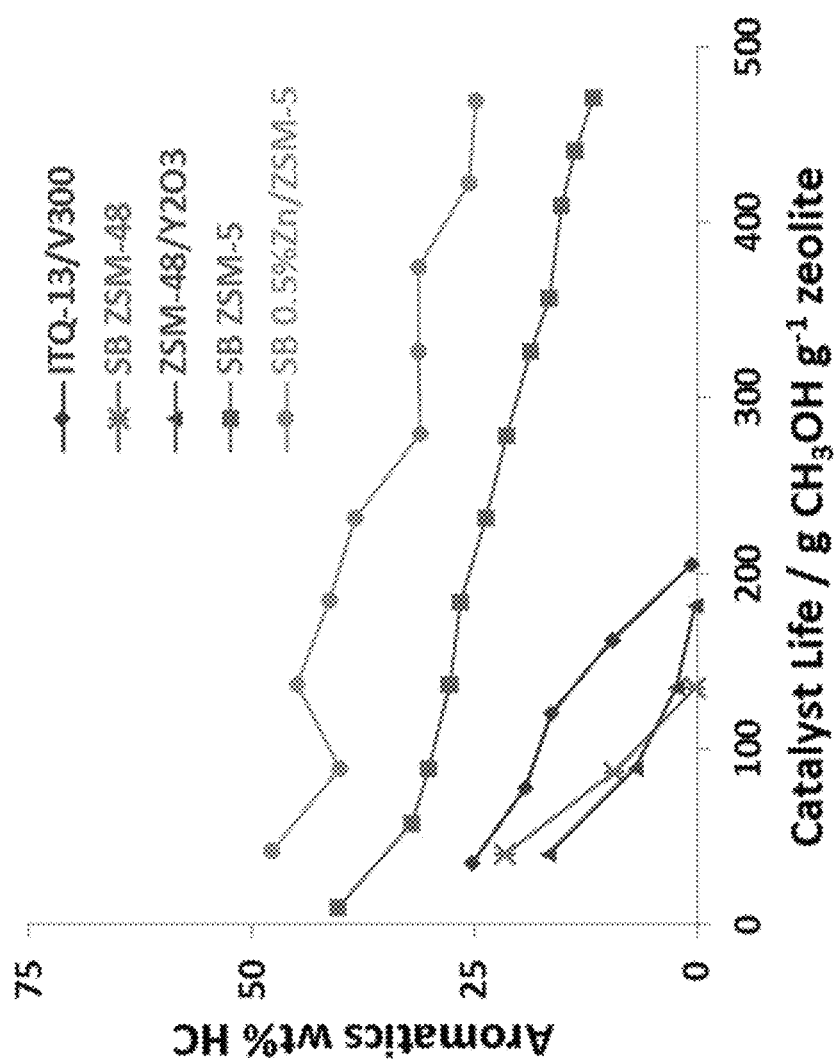
FIG. 5 shows relative yields from conversion of methanol and methanol plus 1-pentene in the presence of a ZSM-5 catalyst.

FIG. 5 shows the aromatic selectivity as a function of cycle length for the tests with each catalyst. For the catalysts other than ZSM-5, the selectivity for aromatic formation starts at about 25 wt % or less at a cycle length of about 50 grams of methanol per gram of catalyst, and then drops until little or no aromatic formation occurs. By contrast, the ZSM-5 catalysts provide a higher aromatic selectivity initially, and the rate of reduction of aromatic selectivity is more gradual. The selectivity for aromatic formation was higher for the 0.5 wt % Zn promoted ZSM-5, and the relative selectivity increase of about 5 wt % to 10 wt % was maintained over the range of cycle lengths included in FIG. 5.

Figure 6:
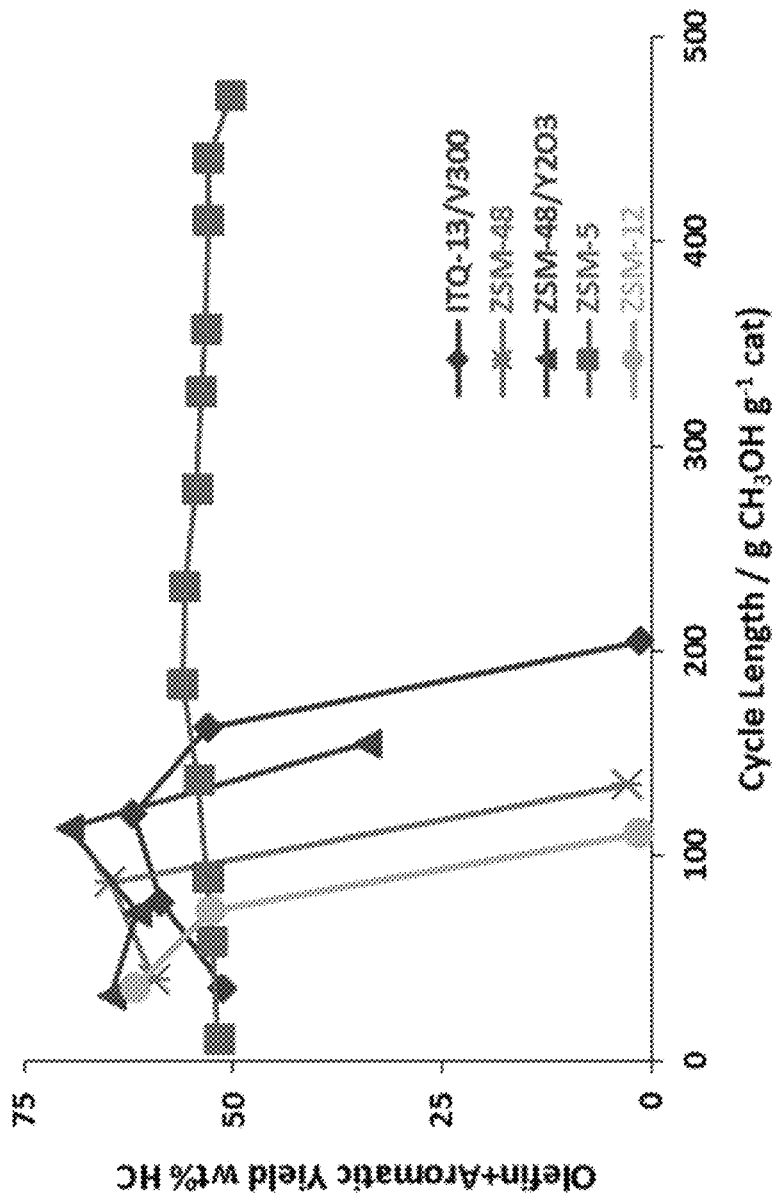
FIG. 6 shows another type of relative yield analysis from conversion of methanol and methanol plus 1-pentene in the presence of a ZSM-5 catalyst.

FIG. 6 shows combined aromatic and olefin selectivity for the non-promoted catalysts shown in FIG. 4 and FIG. 5. The combined aromatic and olefin selectivity is also shown for an additional self-bound zeolite catalyst (ZSM-12). FIG. 6 shows that the combined olefin and aromatic yield for the ZSM-5 catalyst remains relatively constant over the range of cycle lengths shown in FIG. 6.

The data in FIG. 4, FIG. 5, and FIG. 6 demonstrate that a reactor that can allow for in-situ regeneration of catalyst can provide an additional method for control of a conversion reaction using either a ZSM-5 catalyst or another type of zeolite. For zeolites other than MFI framework structure zeolites, a moving bed or fluidized bed reactor with catalyst regeneration can be used to control the average cycle length for the catalyst in the reactor to a value between about 50 grams to about 150 grams of methanol per gram of catalyst. For MFI framework structure zeolites, a broader range of average cycle lengths can be suitable. If greater aromatic production is desired, a shorter average cycle length can be selected, such as an average cycle length of about 50 grams to about 250 grams of methanol per gram of catalyst, or about 50 grams to about 200 grams, or about 100 grams to about 250 grams. If greater olefin product is desired, a longer average cycle length can be selected, such as an average cycle length of about 250 grams to about 500 grams of methanol per gram of catalyst, or about 300 grams to about 500 grams.

Example 3—Influence of Metal Loadings on Conversion

ZSM-5 self-bound catalyst similar to the catalyst in Example 1 was impregnated with Zn to achieve metal loadings of 0.5 wt % Zn, 1.0 wt % Zn, and 3.0 wt % Zn relative to the total weight of the catalyst. The catalysts with the various Zn loadings and the self-bound catalyst without Zn were then used for methanol conversion in an apparatus similar to the apparatus in Example 2. The feed was similar to the feed in Example 1, and the reactor conditions included a reactor temperature of 450° C., a reactor pressure of ~100 kPag, and a WHSV of about 2.0 $hr^{-1}$.

Figure 7:
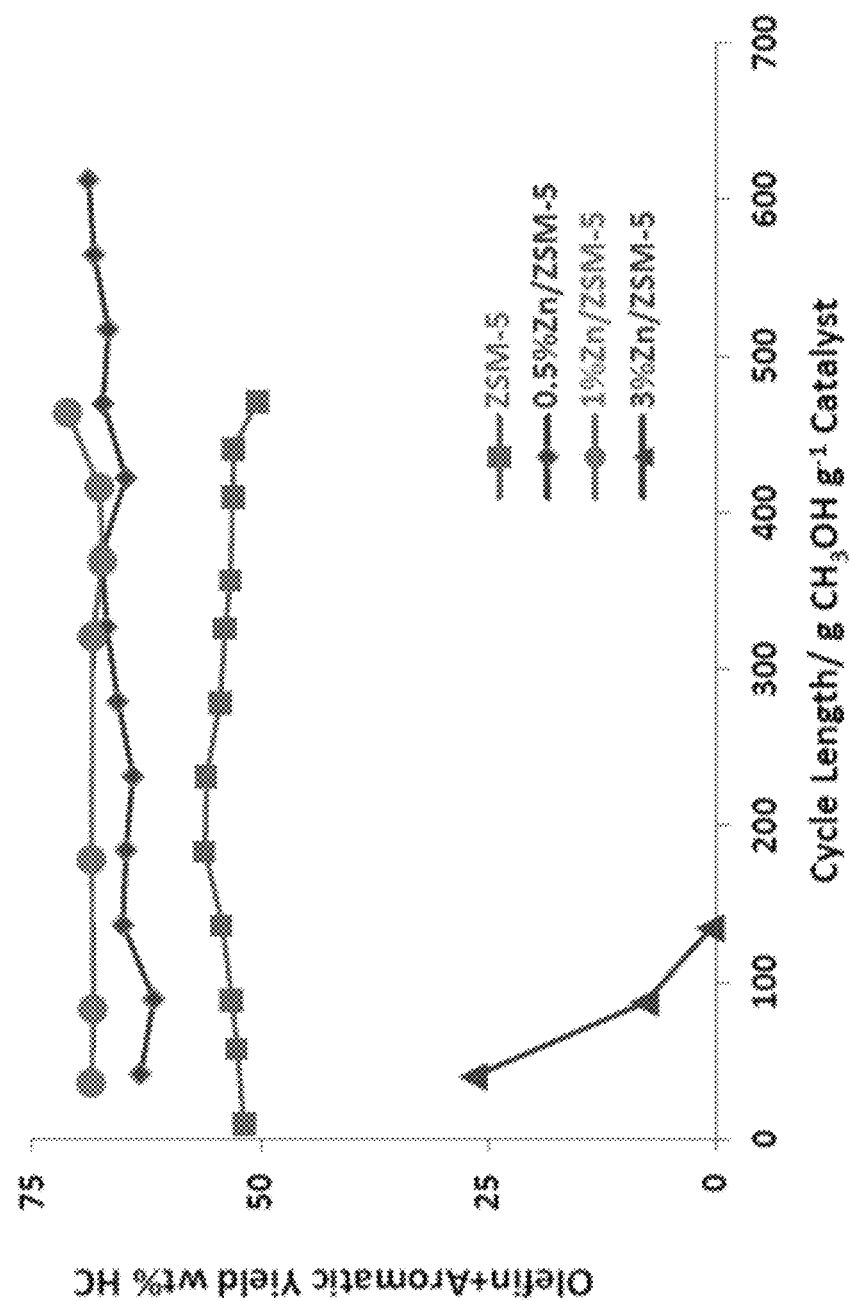
FIG. 7 shows relative aromatic yields from conversion of methanol and methanol plus 1-pentene in the presence of a ZSM-5 catalyst.

FIG. 7 shows combined olefin and aromatic yields relative to cycle length from the testing of the ZSM-5 catalysts with various Zn loadings. As shown in FIG. 7, addition of 0.5 wt % or 1.0 wt % Zn on the catalyst resulted in an increase in combined olefins and aromatics yield from 50 wt % to 55 wt % for the non-promoted ZSM-5 to 65 wt % to 75 wt % for the Zn-promoted ZSM-5 catalysts. These combined yields were also relatively stable as the average cycle length for the catalyst was increased. However, increasing the Zn loading further to 3.0 wt % resulted in a sharp drop in activity, so that little or no combined olefins and aromatics were produced at cycle lengths of about 150 grams or more of methanol per gram of catalyst.

Example 4—Influence of Phosphorus Loadings on Conversion

ZSM-5 self-bound catalyst similar to the catalyst in Example 1 was impregnated with Zn to achieve a Zn loading of 1.0 wt %. Various catalyst samples were then impregnated with phosphorus to achieve relative molar phosphorus loadings of 0.8 mol P/mol Zn, 2.4 moles P/mol Zn, and 4.5 mol P/mol Zn. After forming the various catalysts with either a 1.0 wt Zn loading or both a Zn and P loading, a sample of each type of catalyst was steamed for 24 hours at 1000° F. (538° C.) in a 100% steam environment. The steaming was believed to be representative of aging that a catalyst would experience during processing. Both steamed and unsteamed versions of the catalyst with 1.0 wt % Zn and the various catalysts with both Zn and P loadings were then used for methanol conversion in an apparatus similar to the apparatus in Example 2. The feed was similar to the feed in Example 1, and the reactor conditions included a reactor temperature of 500° C., a reactor pressure of ~100 kPag, and a WHSV of about 20 hr$^{-1}$. The conditions allowed for 100% conversion of the methanol in the feed.

Figure 8:
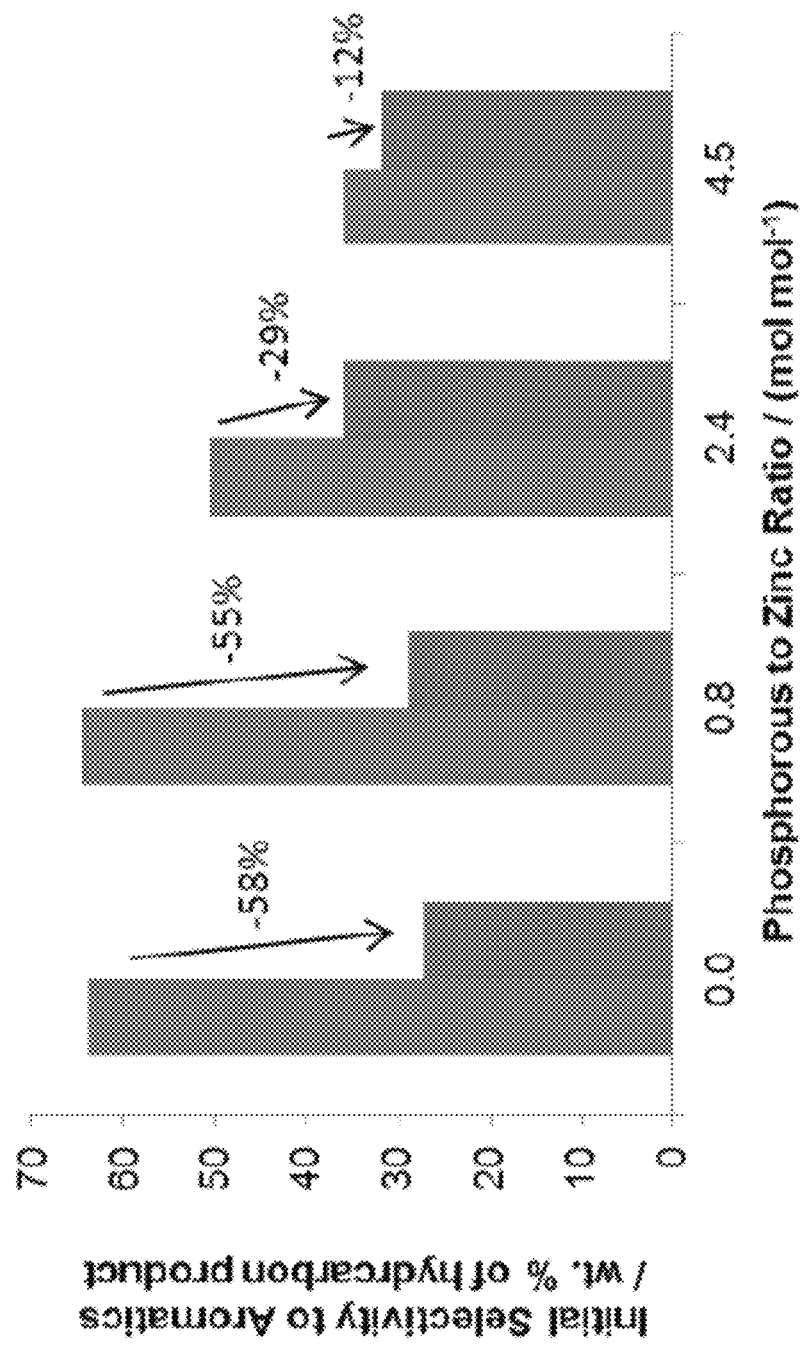
FIG. 8 shows relative aromatic yields from conversion of methanol and methanol plus 1-pentene in the presence of a 1 wt % Zn-ZSM-5 catalyst.

FIG. 8 shows a comparison of the aromatic selectivity for the unsteamed and steamed versions of each catalyst. The left bar in each pair of bars represents the initial selectivity for aromatic formation of the unsteamed version of each catalyst. The right bar in each pair of bars represents the corresponding activity of the steamed version of the catalyst. As shown in FIG. 8, a phosphorus loading of at least about 2.0 mol P/mol Zn, or at least about 2.4, can allow a catalyst to retain a higher percentage of initial selectivity for aromatics. Although the initial selectivity for aromatics is somewhat reduced for unsteamed catalysts with at least 2.0 mol P/mol Zn, the aromatic selectivity for the steamed catalyst is still greater than the aromatic selectivity for a steamed catalyst having less than 2.0 mol P/mol Zn. This steaming data is believed to correlate with expected aromatic selectivity for catalysts at long cycle lengths.

Example 5—Olefin Oligomerization

Olefin oligomerization catalysts were tested in an isothermal fixed-bed reactor without recycle. In some alternative aspects, a portion of the oligomerization effluent could be recycled to the oligomerization reactor and/or to the oxygenate conversion reactor. The oligomerization activity and selectivity of various catalysts were investigated using a propylene feed. The feed was exposed to various catalysts at a temperature of about 200° C., a pressure of about 800 psig (~5500 kPag), and a WHSV of about 1.66 hr$^{-1}$ relative to the weight of the oligomerization catalyst. The catalysts corresponded to H-form self-bound catalysts based on ZSM-5 (MFI framework; 3-D 10-member ring; Labeled "A" in FIG. 9), ZSM-48 (MRE framework; 1-D 10-member ring; "B"), ZSM-12 (MTW framework; 1-D 12-member ring; "C"), MCM-49 (MWW framework; 2-D 10-member ring; "D"), and a steamed version of the MCM-49 (MWW framework; 2-D 10-member ring; "E").

Figure 9:
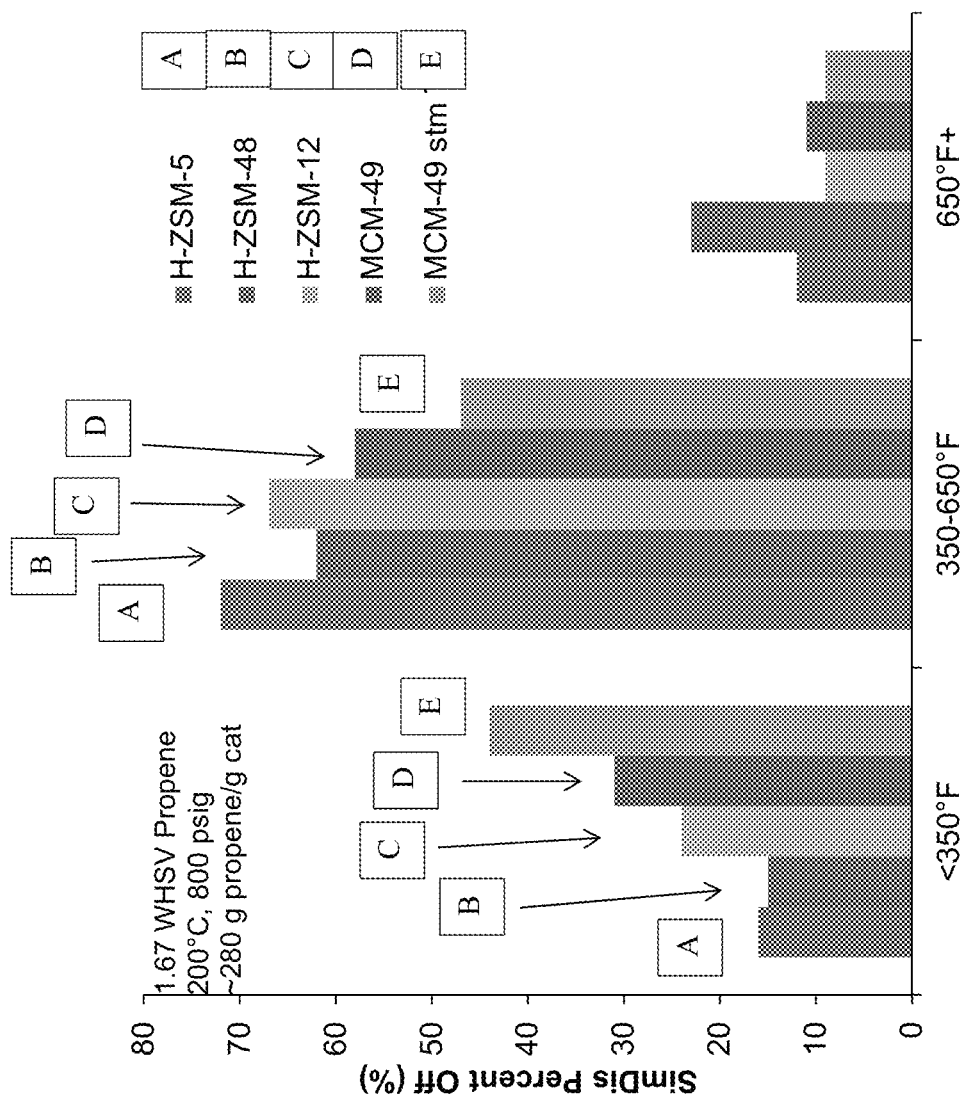
FIG. 9 shows results from conversion of methanol in the presence of a ZSM-48 catalyst.

The total hydrocarbon effluent from the oligomerization reaction was fractionated to form a light fraction (initial boiling point—177° C.), a distillate fuels fraction (177° C.-371° C.), and a 371° C.+ fraction. FIG. 9 shows the selectivities for each product fraction for each of the catalysts. As indicated in FIG. 9, ZSM-5 and ZSM-48 had relatively low selectivities for formation of the lower boiling fraction (i.e., the fraction including naphtha boiling range products). Although ZSM-48 had a somewhat lower selectivity than ZSM-5 for forming the distillate fuel fraction, it is noted that the "distillate fuel" fraction shown in FIG. 9 has an upper end of 343° C. The relatively high yield of 343° C.+ compounds from ZSM-48 means that the total 177° C.+ yield for ZSM-48 is comparable to the total 177° C.+ yield for ZSM-5.

Figure 10:
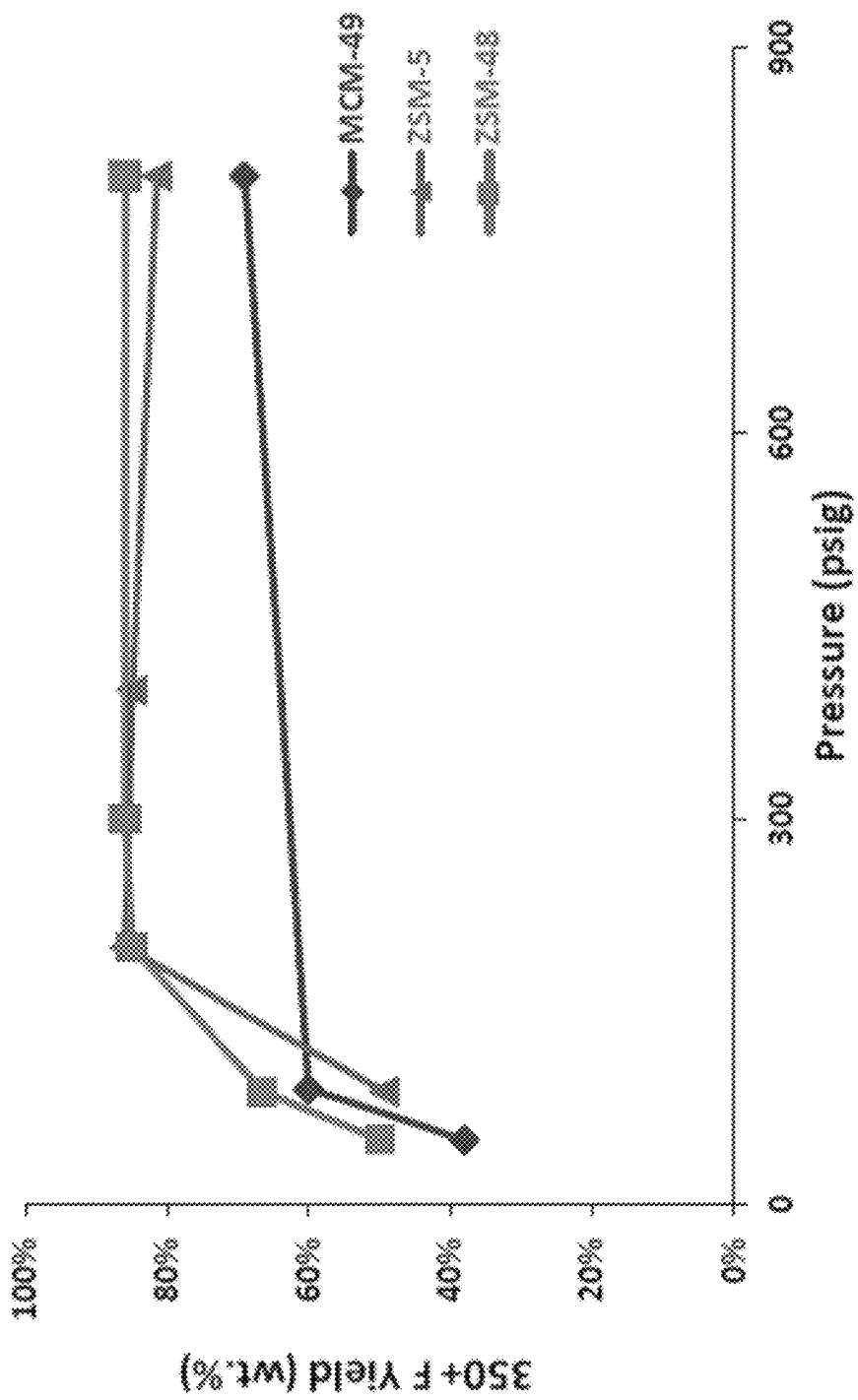
FIG. 10 shows results from conversion of methanol plus 1-pentene in the presence of a ZSM-48 catalyst.

The ZSM-5, ZSM-48, and (unsteamed) MCM-49 catalysts were further tested to determine the influence of reactor pressure on 177° C.+ yield. FIG. 10 shows the 177° C.+ yield for oligomerization with ZSM-5, ZSM-48, and MCM-49 catalysts for a propylene feed at a temperature of about 200° C., a WHSV of 1.66 hr$^{-1}$, and reactor pressures ranging from about 15 psig (~100 kPag) to about 800 psig (~5500 kPag). As shown in FIG. 10, increasing the reactor pressure above about 200 psig (~1400 kPag) has a relatively minor impact on the distillate yield (177° C.+) from oligomerization in the presence of each of the catalysts. Similar to FIG. 9, the ZSM-5 and ZSM-48 catalysts provided the highest 177° C.+ yields.

FIG. 10 also appears to show that at lower pressures, ZSM-48 can provide a substantial benefit in distillate yield relative to ZSM-5. In particular, at pressures of 1400 kPag or less, the 177° C.+ yield for ZSM-48 is between 50 wt % to 65 wt %, while the 177° C.+ yield for oligomerization over ZSM-5 just reaches about 50 wt % at ~1400 kPag.

The distillate boiling range products generated from oligomerization in the presence of ZSM-5 and ZSM-48 can also have a relatively high cetane rating. Additional oligomerization of propylene feed was performed using ZSM-5 and ZSM-48 catalysts at a reactor temperature of 200° C., a WHSV of 2.0 hr$^{-1}$, and a pressure of either ~1400 kPag or ~5500 kPag. Table 4 shows results from the oligomerization reactions, including cetane for a distillate fuel boiling range fraction, cetane for a 371° C.+ fraction, and aromatics content for the distillate fuel boiling range fraction. As shown in Table 4, all of the distillate fuel boiling range fractions formed by oligomerization had an aromatics content of less than about 0.1 wt %. These aromatics contents were determined by UV adsorption, and then correlating the measured UV adsorption with an aromatics content. Additionally, the amount of aromatics produced by oligomerization with ZSM-48 at low pressure conditions (first row of Table 4) was about half of the amount of aromatics produced by oligomerization with ZSM-5 at the higher pressure conditions (final row of Table 4). The cetane ratings for the distillate fuel boiling range fractions were similar at about 43 or 44. The 371° C.+ fractions generated using the ZSM-5 catalyst had somewhat higher cetane ratings of at least 55, as compared to the cetane rating of ~52 for the 371° C.+ fraction generated by oligomerization in the presence of ZSM-48.

TABLE 4

Distillate products from oligomerization

|  | 177° C.-371° C. cetane | 177° C.-371° C. aromatics | 371° C.+ cetane |
|---|---|---|---|
| ZSM-48, ~1400 kPag | 43.2 | <0.1 wt % | 52.1 |
| ZSM-5, ~1400 kPag | 43.3 | <0.1 wt % | 55.7 |
| ZSM-5, ~5500 kPag | 44.2 | <0.1 wt % | 57.1 |

Additional Embodiments

Embodiment 1

A method for forming a naphtha composition and a distillate composition, comprising: exposing a feed comprising oxygenates to a conversion catalyst at an average reaction temperature of 400° C. to 530° C. (or 440° C. to 530° C.), a total pressure of at least 150 psig (~1000 kPag), and a WHSV of 0.1 $hr^{-1}$ to 10 $hr^{-1}$ to form a converted effluent comprising a naphtha boiling range fraction, the naphtha boiling range fraction having an octane rating of at least 95; and cascading at least a portion of the converted effluent to an oligomerization catalyst at a temperature of 125° C. to 250° C. to form an oligomerized effluent, the at least a portion of the converted effluent comprising ethylene, propylene, or a combination thereof, the oligomerized effluent comprising, relative to a weight of hydrocarbons in the oligomerized effluent, at least 60 wt % of a distillate boiling range fraction (or at least 65 wt %, or at least 70 wt %), at least 10 wt % of a 371° C.+ fraction (or at least 15 wt %), and less than 20 wt % of a 177° C.− fraction, the distillate boiling range fraction having an aromatics content of about 1.0 wt % or less (or 0.5 wt % or less).

Embodiment 2

The method of Embodiment 1, wherein the oligomerization catalyst comprises a 1-D 10-member ring zeolite or a 2-D 10-member ring zeolite, the zeolite optionally comprising an MRE framework structure, an MFI framework structure, or a combination thereof, the zeolite having a silicon to aluminum ratio of 10 to 200, or 20 to 40, and an Alpha value of at least 5, or at least 15, or at least 100.

Embodiment 3

The method of any of the above embodiments, wherein the distillate boiling range fraction has a cetane rating of at least 40, wherein the 371° C.+ fraction has a cetane rating of at least 50, or a combination thereof.

Embodiment 4

The method of any of the above embodiments, wherein the conversion catalyst comprises an MFI framework zeolite, the conversion catalyst further comprising 0.5 wt % to 1.5 wt % Zn supported on the conversion catalyst, the conversion catalyst optionally further comprising P supported on the conversion catalyst, a molar ratio of P to Zn supported on the conversion catalyst being about 1.5 to 3.0.

Embodiment 5

The method of any of the above embodiments, wherein the at least a portion of the converted effluent is exposed to the oligomerization catalyst at a pressure of 150 psig (~1000 kPag) to about 300 psig (~2100 kPag).

Embodiment 6

The method of any of the above embodiments, wherein cascading at least a portion of the converted effluent to an oligomerization catalyst further comprises separating water from the at least a portion of the converted effluent prior to exposing the at least a portion of the converted effluent to the oligomerization catalyst, the at least a portion of the converted effluent comprising about 10 wt % or less of water relative to a total weight of the converted effluent.

Embodiment 7

The method of any of the above embodiments, wherein the conversion catalyst and the oligomerization catalyst are located in the same reactor; or wherein the at least a portion of the converted effluent is exposed to the oligomerization catalyst without prior compression; or a combination thereof.

Embodiment 8

A method for forming a naphtha composition and a distillate composition, comprising: exposing a feed comprising oxygenates to a conversion catalyst at an average reaction temperature of about 440° C. to about 530° C. (or about 450° C. to about 500° C.), a total pressure of 100 psig (~700 kPag) to 300 psig (~2100 kPag), and a WHSV of 0.1 $hr^{-1}$ to 10.0 $hr^{-1}$ to form a converted effluent comprising at least 50 wt % of a naphtha boiling range fraction relative to a weight of hydrocarbons in the converted effluent, the naphtha boiling range fraction comprising at least 40 wt % aromatics, the converted effluent further comprising ethylene, propylene, or a combination thereof; separating at least a portion of the converted effluent to form at least a first effluent fraction comprising at least 50 wt % of the naphtha boiling range fraction and a second effluent fraction comprising at least 50 wt % of the ethylene, propylene, or a combination thereof, at least one of the first effluent fraction and the naphtha boiling range fraction having an octane rating of at least 95, the octane rating being defined as (RON+MON)/2; and exposing at least a portion of the second effluent fraction to an oligomerization catalyst at a temperature of 125° C. to 250° C. and a total pressure of 150 psig (~1000 kPag) to 1000 psig (~6900 kPag) to form an oligomerized effluent comprising, relative to a weight of hydrocarbons in the oligomerized effluent, at least 60 wt % of a distillate boiling range fraction (or at least 65 wt %, or at least 70 wt %), at least 10 wt % of a 371° C.+ fraction (or at least 15 wt %), and less than 20 wt % of a 177° C.− fraction, the distillate boiling range fraction having an aromatics content of about 1.0 wt % or less (or 0.5 wt % or less) and a cetane rating of at least 40, the 371° C.+ fraction having a cetane rating of at least 50, wherein the conversion catalyst comprises a 10-member ring zeolite (preferably having MFI framework structure), the zeolite having a silicon to aluminum ratio of 10 to 200 (preferably 20 to 40) and an Alpha value of at least 5 (preferably at least 100), the conversion catalyst further comprising 0.1 wt % to 1.5 wt % Zn supported on the catalyst.

Embodiment 9

The method of Embodiment 8, wherein the conversion catalyst further comprises P supported on the conversion catalyst, a molar ratio of P to Zn supported on the conversion catalyst being about 1.5 to 3.0.

Embodiment 10

The method of any of Embodiments 8 or 9, wherein exposing the feed comprising oxygenates to a conversion catalyst comprises exposing the feed comprising oxygenate to the conversion catalyst in a fluidized bed, a moving bed, a riser reactor, or a combination thereof, the conversion catalyst being withdrawn and regenerated at a rate corresponding to regeneration of 0.3 wt % to 5.0 wt % of catalyst per 1 g of methanol exposed to a g of conversion catalyst (optionally 1.5 wt % to 3.0 wt %); or wherein the oxygenates comprises methanol, the conversion catalyst comprising a) an average catalyst exposure time of 1 gram to 250 grams of methanol per gram of catalyst or b) an average catalyst exposure time of 250 grams to 500 grams of methanol per gram of catalyst; or a combination thereof.

Embodiment 11

The method of any of Embodiments 8-10, a) wherein the oligomerization catalyst comprises an MRE framework zeolite, an MFI framework zeolite, or a combination thereof, preferably ZSM-48; b) wherein the conversion catalyst comprises an MRE framework zeolite, an MFI framework zeolite, an MEL framework zeolite, or a combination thereof, preferably ZSM-5; or c) a combination of a) and b).

Embodiment 12

A method for forming a naphtha composition and a distillate composition, comprising: exposing a feed comprising methanol to a conversion catalyst in a fluidized bed or moving bed at an average reaction temperature of about 400° C. to about 530° C., a total pressure of 100 psig (~700 kPag) to 300 psig (~2100 kPag), and a WHSV of 0.1 hr$^{-1}$ to 10.0 hr$^{-1}$ to form a converted effluent comprising a naphtha boiling range fraction; separating at least a portion of the converted effluent to form at least a first effluent fraction comprising at least 50 wt % of the naphtha boiling range fraction and a second effluent fraction comprising ethylene, propylene, or a combination thereof; and exposing at least a portion of the second effluent fraction to an oligomerization catalyst at a temperature of 125° C. to 250° C. and a total pressure of 150 psig (~1000 kPag) to 1000 psig (~6900 kPag) to form an oligomerized effluent comprising, relative to a weight of hydrocarbons in the oligomerized effluent, at least 60 wt % of a distillate boiling range fraction (or at least 65 wt %, or at least 70 wt %), at least 10 wt % of a 371° C.+ fraction (or at least 15 wt %), and less than 20 wt % of a 177° C.− fraction, the distillate boiling range fraction having an aromatics content of about 1.0 wt % or less (or 0.5 wt % or less) and a cetane rating of at least 40, the 371° C.+ fraction having a cetane rating of at least 50, wherein the conversion catalyst comprises a 10-member ring or 12-member ring zeolite, the zeolite having a framework structure different from an MFI or MEL framework structure, the zeolite having a silicon to aluminum ratio of 10 to 200 (or 20 to 40) and an Alpha value of at least 5 (or at least 100), the conversion catalyst further comprising 0.1 wt % to 1.5 wt % Zn supported on the catalyst, and wherein the conversion catalyst comprises an average catalyst exposure time of 25 grams to 200 grams of methanol per gram of catalyst (or 50 grams to 180 grams, or 25 grams to 150 grams, or 50 grams to 150 grams, or 75 grams to 150 grams, or 100 grams to 150 grams).

Embodiment 13

The method of any of Embodiments 8-12, wherein the framework structure of the conversion catalyst is the same as a framework structure for the oligomerization catalyst; or wherein the conversion catalyst comprises the same zeolite as a zeolite of the oligomerization catalyst, the zeolite optionally comprising ZSM-48.

Embodiment 14

A composition comprising an effluent from a process for conversion of methanol, the composition comprising at least 40 wt % water, the composition further comprising, relative to a weight of hydrocarbons in the composition, at least 50 wt % of a naphtha boiling range fraction (or at least 55 wt %, or at least 60 wt %), the naphtha boiling range fraction comprising at least 35 wt % aromatics and at least 20 wt % paraffins, at least 50 wt % of the paraffins in the composition comprising $C_3$ or $C_4$ paraffins and 15 wt % to 30 wt % of the paraffins comprising $C_5$+ paraffins, wherein the naphtha boiling range fraction has an octane rating of at least 95 (or at least 97 or at least 100), the octane rating being defined as (RON+MON)/2, the naphtha boiling range fraction optionally comprising at least 40 wt % aromatics and less than 10 wt % olefins.

Embodiment 15

A system for performing oxygenate conversion, comprising: a conversion reactor comprising a conversion reactor inlet and a conversion reactor outlet, the conversion reactor further comprising a conversion catalyst comprising a 10-member ring zeolite (optionally having an MFI framework structure, MEL framework structure, and/or MRE framework structure), the zeolite having a silicon to aluminum ratio of 10 to 200 (or 20 to 40) and an Alpha value of at least 5 (or at least 15 or at least 100), the conversion catalyst further comprising 0.1 wt % to 1.5 wt % Zn supported on the catalyst; a separation stage comprising a separator inlet, a first separator outlet, a second separator product, and an aqueous phase outlet, the separator inlet being in direct fluid communication with the conversion reactor outlet, the direct fluid communication not passing through a compressor; and an oligomerization reactor comprising an oligomerization reactor inlet and an oligomerization reactor outlet, the oligomerization reactor further comprising an oligomerization catalyst, the oligomerization reactor inlet being in direct fluid communication with the first separator outlet, the direct fluid communication not passing through a compressor, the oligomerization reactor inlet being in indirect fluid communication with the conversion reactor outlet via the separation stage, the oligomerization catalyst comprising a 10-member ring zeolite (optionally having an MRE and/or MFI framework structure), the zeolite having a silicon to aluminum ratio of 10 to 200 (or 20 to 40) and an Alpha value of at least 5 (or at least 10).

Embodiment 16

A naphtha boiling range fraction made according to the method of any of Embodiments 1-13 or made using the system of Embodiment 15.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A method for forming a naphtha composition and a distillate composition, comprising:
    exposing a feed comprising oxygenates to a conversion catalyst at an average reaction temperature of 400° C. to 530° C., a total pressure of at least 150 psig (~1000 kPag), and a WHSV of 0.1 $hr^{-1}$ to 10 $hr^{-1}$ to form a converted effluent comprising a naphtha boiling range fraction, the naphtha boiling range fraction having an octane rating of at least 95; and
    cascading at least a portion of the converted effluent comprising at least 50 wt % of ethylene, propylene, or a combination thereof to an oligomerization catalyst at a temperature of 125° C. to 250° C. to form an oligomerized effluent, the oligomerized effluent comprising, relative to a weight of hydrocarbons in the oligomerized effluent, at least 60 wt % of a distillate boiling range fraction, at least 10 wt % of a 371° C.+ fraction, and less than 20 wt % of a 177° C.− fraction, the distillate boiling range fraction having an aromatics content of about 1.0 wt % or less
    wherein the at least a portion of the converted effluent is exposed to the oligomerization catalyst at a pressure of 150 psig (~1000 kPag) to about 300 psig (~2100 kPag).

2. The method of claim 1, wherein the oligomerization catalyst comprises a zeolite having an MRE framework structure, an MFI framework structure, or a combination thereof, the zeolite having a silicon to aluminum ratio of 10 to 200 and an Alpha value of at least 5.

3. The method of claim 1, wherein the distillate boiling range fraction has a cetane rating of at least 40, wherein the 371° C.+ fraction has a cetane rating of at least 50, or a combination thereof.

4. The method of claim 1, wherein the conversion catalyst comprises an MFI framework zeolite, the conversion catalyst further comprising 0.5 wt % to 1.5 wt % Zn supported on the conversion catalyst.

5. The method of claim 4, wherein the conversion catalyst further comprises P supported on the conversion catalyst, a molar ratio of P to Zn supported on the conversion catalyst being about 1.5 to 3.0.

6. The method of claim 1, wherein cascading at least a portion of the converted effluent to an oligomerization catalyst further comprises separating water from the at least a portion of the converted effluent prior to exposing the at least a portion of the converted effluent to the oligomerization catalyst, the at least a portion of the converted effluent comprising about 10 wt % or less of water relative to a total weight of the converted effluent.

7. The method of claim 1, wherein the conversion catalyst and the oligomerization catalyst are located in the same reactor; or wherein the at least a portion of the converted effluent is exposed to the oligomerization catalyst without prior compression; or a combination thereof.

8. A method for forming a naphtha composition and a distillate composition, comprising:
    exposing a feed comprising oxygenates to a conversion catalyst at an average reaction temperature of about 440° C. to about 530° C. (or about 450° C. to about 500° C.), a total pressure of 100 psig (~700 kPag) to 300 psig (~2100 kPag), and a WHSV of 0.1 $hr^{-1}$ to 10.0 $hr^{-1}$ to form a converted effluent comprising at least 50 wt % of a naphtha boiling range fraction relative to a weight of hydrocarbons in the converted effluent, the naphtha boiling range fraction comprising at least 40 wt % aromatics, the converted effluent further comprising ethylene, propylene, or a combination thereof;
    separating at least a portion of the converted effluent to form at least a first effluent fraction comprising at least 50 wt % of the naphtha boiling range fraction and a second effluent fraction comprising at least 50 wt % of the ethylene, propylene, or a combination thereof, at least one of the first effluent fraction and the naphtha boiling range fraction having an octane rating of at least 95, the octane rating being defined as (RON+MON)/2; and
    exposing at least a portion of the second effluent fraction to an oligomerization catalyst at a temperature of 125° C. to 250° C. and a total pressure of 150 psig (~1000 kPag) to 1000 psig (~6900 kPag) to form an oligomerized effluent comprising, relative to a weight of hydrocarbons in the oligomerized effluent, at least 60 wt % of a distillate boiling range fraction, at least 10 wt % of a 371° C.+ fraction, and less than 20 wt % of a 177° C.− fraction, the distillate boiling range fraction having an aromatics content of about 1.0 wt % or less and a cetane rating of at least 40, the 371° C.+ fraction having a cetane rating of at least 50,
    wherein the conversion catalyst comprises a 10-member ring zeolite, the zeolite having a silicon to aluminum ratio of 10 to 200 and an Alpha value of at least 5, the conversion catalyst further comprising 0.1 wt % to 1.5 wt % Zn supported on the catalyst.

9. The method of claim 8, wherein the conversion catalyst further comprises P supported on the conversion catalyst, a molar ratio of P to Zn supported on the conversion catalyst being about 1.5 to 3.0.

10. The method of claim 8, wherein exposing the feed comprising oxygenates to a conversion catalyst comprises exposing the feed comprising oxygenate to the conversion catalyst in a fluidized bed, a moving bed, a riser reactor, or a combination thereof, the conversion catalyst being withdrawn and regenerated at a rate corresponding to regeneration of 0.3 wt % to 5.0 wt % of catalyst per 1 g of methanol exposed to a g of conversion catalyst.

11. The method of claim 8, wherein the oxygenates comprises methanol, the conversion catalyst comprising a) an average catalyst exposure time of 1 gram to 250 grams of methanol per gram of catalyst or b) an average catalyst exposure time of 250 grams to 500 grams of methanol per gram of catalyst.

12. The method of claim 8, wherein the oligomerization catalyst comprises ZSM-48.

13. The method of claim 12, wherein the conversion catalyst comprises ZSM-5.

14. A method for forming a naphtha composition and a distillate composition, comprising:
    exposing a feed comprising methanol to a conversion catalyst in a fluidized bed or moving bed at an average reaction temperature of about 400° C. to about 530° C., a total pressure of 100 psig (~700 kPag) to 300 psig (~2100 kPag), and a WHSV of 0.1 $hr^{-1}$ to 10.0 $hr^{-1}$ to form a converted effluent comprising a naphtha boiling range fraction;
    separating at least a portion of the converted effluent to form at least a first effluent fraction comprising at least 50 wt % of the naphtha boiling range fraction and a second effluent fraction comprising ethylene, propylene, or a combination thereof; and exposing at least a portion of the second effluent fraction to an oligomerization catalyst at a temperature of 125° C. to 250° C. and a total pressure of 150 psig (~1000 kPag) to 1000 psig (~6900 kPag) to form an oligomerized effluent comprising, relative to a weight of hydrocarbons in the oligomerized effluent, at least 60 wt % of a distillate boiling range fraction, at least 10 wt % of a 371° C.+ fraction, and less than 20 wt % of a 177° C.− fraction, the distillate boiling range fraction having an aromatics content of about 1.0 wt % or less and a cetane rating of at least 40, the 371° C.+ fraction having a cetane rating of at least 50, wherein the conversion catalyst comprises a 10-member ring or 12-member ring zeolite, the zeolite having a framework structure different from an MFI or MEL framework structure, the zeolite having a silicon to aluminum ratio of 10 to 200 and an Alpha value of at least 5, the conversion catalyst further comprising 0.1 wt % to 1.5 wt % Zn supported on the catalyst, and wherein the conversion catalyst comprises an average catalyst exposure time of 25 grams to 200 grams of methanol per gram of catalyst.

15. The method of claim 14, wherein the framework structure of the conversion catalyst is the same as a framework structure for the oligomerization catalyst.

16. The method of claim 14, wherein the conversion catalyst and the oligomerization catalyst comprise ZSM-48.

17. A composition comprising an effluent from a process for conversion of methanol, the composition comprising at least 40 wt % water, the composition further comprising, relative to a weight of hydrocarbons in the composition, at least 50 wt % of a naphtha boiling range fraction, the naphtha boiling range fraction comprising at least 35 wt % aromatics and at least 20 wt % paraffins, at least 50 wt % of the paraffins in the composition comprising $C_3$ or $C_4$ paraffins and 15 wt % to 30 wt % of the paraffins comprising $C_5$+ paraffins wherein the naphtha boiling range fraction has an octane rating of at least 95 (or at least 97), the octane rating being defined as (RON+MON)/2.

18. The composition of claim 17, wherein the naphtha boiling range fraction comprises at least 40 wt % aromatics and less than 10 wt % olefins, the naphtha boiling range fraction having an octane rating of at least 100.

19. The composition of claim 17, wherein the composition comprises at least 55 wt % of the naphtha boiling range fraction, or at least 60 wt %.

20. A system for performing oxygenate conversion, comprising:

a conversion reactor comprising a conversion reactor inlet and a conversion reactor outlet, the conversion reactor further comprising a conversion catalyst comprising a zeolite having an MFI or MEL framework structure, the zeolite structure having a silicon to aluminum ratio of 20 to 40 and an Alpha value of at least 5, the conversion catalyst further comprising 0.1 wt % to 1.5 wt % Zn supported on the catalyst;

a separation stage comprising a separator inlet, a first separator outlet, a second separator product, and an aqueous phase outlet, the separator inlet being in direct fluid communication with the conversion reactor outlet, the direct fluid communication not passing through a compressor; and an oligomerization reactor comprising an oligomerization reactor inlet and an oligomerization reactor outlet, the oligomerization reactor further comprising an oligomerization catalyst, the oligomerization reactor inlet being in direct fluid communication with the first separator outlet, the direct fluid communication not passing through a compressor, the oligomerization reactor inlet being in indirect fluid communication with the conversion reactor outlet via the separation stage, the oligomerization catalyst comprising a 10-member ring zeolite, the zeolite having a silicon to aluminum ratio of 10 to 200 and an Alpha value of at least 5.

* * * * *